United States Patent
Kalia et al.

(10) Patent No.: US 12,537,557 B2
(45) Date of Patent: Jan. 27, 2026

(54) DIFFERENTIAL ELECTRICAL BALANCE DUPLEXERS

(71) Applicant: Texas Instruments Incorporated, Dallas, TX (US)

(72) Inventors: Sachin Kalia, Dallas, TX (US); Tolga Dinc, Dallas, TX (US); Swaminathan Sankaran, Allen, TX (US); Sasank Garikapati, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 326 days.

(21) Appl. No.: 17/823,292

(22) Filed: Aug. 30, 2022

(65) Prior Publication Data

US 2024/0072839 A1 Feb. 29, 2024

(51) Int. Cl.
*H04B 1/525* (2015.01)
*H03H 7/46* (2006.01)
(Continued)

(52) U.S. Cl.
CPC ............ *H04B 1/525* (2013.01); *H03H 7/463* (2013.01); *H04B 1/0057* (2013.01); *H04L 5/14* (2013.01)

(58) Field of Classification Search
CPC .. H04M 1/0214; H04M 1/026; H04M 1/0262; H04M 1/035; H04M 1/02; H04M 1/03; H04L 5/14; H04B 1/0057; H04B 1/525; H04B 1/00; H03H 7/463; H03H 7/46
See application file for complete search history.

(56) References Cited

U.S. PATENT DOCUMENTS

| 7,010,621 | B2 * | 3/2006 | Calkins ................. H04B 15/04 713/400 |
| 7,065,583 | B2 * | 6/2006 | Konz ............... H04L 12/40032 709/250 |

(Continued)

FOREIGN PATENT DOCUMENTS

EP 3510702 B1 * 9/2020 ............... H03F 3/19

OTHER PUBLICATIONS

Abdelhalem, et al., "Hybrid Transformer-Based Tunable Differential Duplexer in a 90-nm CMOS Process," IEEE Transactions on Microwave Theory and Techniques, vol. 61, No. 3, Mar. 2013. pp. 1316-1326.

(Continued)

*Primary Examiner* — Nathan S Taylor
(74) *Attorney, Agent, or Firm* — Frank D. Cimino

(57) ABSTRACT

Electrical balance duplexers (EBDs). An example EBD includes a differential TX port coupled to a first coil, a differential RX port coupled to a second coil, a differential ANT port coupled to a third coil, and a differential BAL port coupled to a fourth coil. In some cases, the first and second coils are arranged such that magnetic flux cancellation is achieved between the two, thus isolating the TX port from the RX port. In some cases, DC isolation exists between the coils. During operation, the first coil may electromagnetically couple with the third coil and the fourth coil, and the second coil may electromagnetically couple with the third coil and the fourth coil. In some example cases, the first and second coils are each in their own metallization layer, and the third and fourth coils are in the same layer.

41 Claims, 18 Drawing Sheets

(51) Int. Cl.
*H04B 1/00* (2006.01)
*H04L 5/14* (2006.01)

(56) References Cited

U.S. PATENT DOCUMENTS

| | | | | |
|---|---|---|---|---|
| 11,855,679 | B2* | 12/2023 | Mesquita | H04B 1/581 |
| 2003/0154316 | A1* | 8/2003 | Konz | H04L 12/40032 |
| | | | | 709/253 |
| 2003/0163748 | A1* | 8/2003 | Calkins | H04B 15/04 |
| | | | | 713/500 |
| 2013/0258911 | A1* | 10/2013 | Choksi | H03H 7/463 |
| | | | | 333/129 |
| 2014/0146718 | A1* | 5/2014 | Mikhemar | H04B 1/52 |
| | | | | 370/278 |
| 2014/0306780 | A1* | 10/2014 | Lehtinen | H03H 7/463 |
| | | | | 29/825 |
| 2016/0065352 | A1* | 3/2016 | Sjöland | H04B 1/525 |
| | | | | 370/281 |
| 2016/0294436 | A1* | 10/2016 | Din | H04B 17/336 |
| 2018/0302058 | A1* | 10/2018 | Hershberg | H03H 7/383 |
| 2021/0184825 | A1* | 6/2021 | Muharemovic | H04B 1/18 |
| 2021/0376735 | A1* | 12/2021 | Parisi | H02M 3/33592 |
| 2022/0166597 | A1* | 5/2022 | Hsiao | H04B 1/525 |
| 2022/0182079 | A1* | 6/2022 | Muharemovic | H03F 1/565 |
| 2023/0036705 | A1* | 2/2023 | Hsiao | H04B 1/12 |
| 2023/0102583 | A1* | 3/2023 | Mesquita | H04B 1/581 |
| | | | | 455/78 |
| 2023/0194656 | A1* | 6/2023 | Song | G01S 7/285 |
| | | | | 342/175 |
| 2023/0344358 | A1* | 10/2023 | Rmila | H02M 3/33569 |
| 2023/0387943 | A1* | 11/2023 | Laughlin | H04B 1/44 |
| 2024/0162833 | A1* | 5/2024 | Chang | H02M 3/158 |

OTHER PUBLICATIONS

Laughlin, et al., "Passive and Active Electrical Balace Duplexers," IEEE Transactionis on Circuits and Systems-II: Express Briefs, 2015. pp. 1-5.

Laughlin, et al., "Performance Variation in Electrical Balance Duplexers due to User Interaction," ResearchGate, https://www.researchgate.net/publication/279511950, Conference Paper, Sep. 2014. 6 pages.

Van Thienen, et al., "A 120GHz In-Band Full-Duplex PMF Transceiver with Tunable Electrical-Balance Duplexer in 40nm CMOS," IEEE, 2017. pp. 103-106.

"Rat-race coupler," Wikipedia, https:/ /en.wikipedia.org/w/index.php?title=Rat-race coupler&oldid= 1084 766786, last edited Apr. 26, 2022. 2 pages.

* cited by examiner

DIFFERENTIAL ELECTRICAL BALANCE DUPLEXERS

TECHNICAL FIELD

This description relates to wireless communications, and more particularly to electrical balance duplexers (EBDs).

BACKGROUND

An electrical balance duplexer (EBD) allows concurrent transmission and reception from the same antenna and in the same frequency band in radios and other communication devices. An EBD includes a receive (RX) port, a transmit (TX) port, a balance network (BAL) port, and an antenna port (ANT). In operation, a given TX signal applied to the TX port is passed to the ANT port, and a given RX signal applied to the ANT port is passed to the RX port. First and second representations of the given TX signal are also received at the RX port, but those representations are 180 degrees out-of-phase with one another and thus largely cancel out, so as to not interfere with RX signals. A given EBD can achieve relatively high isolation between the TX and RX paths, responsive to the balancing impedance being well-matched to the antenna impedance. The antenna impedance may vary over time (e.g., due to environmental changes). Accordingly, some EBDs are configured so that the balance network can be dynamically adjusted to track the antenna impedance, thus maintaining a desired degree of TX/RX isolation. However, a number of non-trivial issues remain with EBDs.

SUMMARY

Techniques are described herein for electrical balance duplexers (EBDs).

In an example, an EBD includes four coils respectively coupled to four ports. In more detail, a differential transmitter (TX) port is coupled to a first coil, and a differential receiver (RX) port is coupled to a second coil. Also, a differential antenna (ANT) port is coupled to a third coil, and a differential balance network (BAL) port is coupled to a fourth coil.

In another example, an EBD structure includes four coils respectively coupled to four ports. The first coil is in a first layer and coupled to a differential transmitter (TX) port. The second coil is in a second layer and coupled to a differential receiver (RX) port. The third coil is in a third layer and coupled to a differential antenna (ANT) port. The fourth coil is in the third layer or a fourth layer and coupled to a differential balance network (BAL) port. The layers can be, for instance, metallization layers of an integrated circuit or printed circuit board arranged in a stack of layers, each layer including conductive runs encased in dielectric material. In one such example, one of the first coil or the second coil crosses-over itself in one or more locations so as to provide two or more non-concentric turns, and the other of the first coil or the second coil does not crossover itself. In another example, both coils may include one or more crossovers. In some cases, the first coil and the second coil are directly aligned with each other, except for respective feedline portions and crossover portions of the one of the first coil or the second coil. In other cases, the first coil is at least partially inward or partially outward of the second coil. Any crossover can be accomplished using the third layer.

In another example, an EBD structure includes four coils respectively coupled to four ports. The first coil is coupled to a first port, and the second coil is coupled to a second port. Also, the third coil is coupled to a third port, and the fourth coil is coupled to a fourth port. The first and second coils are arranged such that magnetic flux cancellation is achieved between the two. Also, direct current (DC) isolation exists between the first coil, third coil, and fourth coil. During operation, the first coil electromagnetically couples with the third coil and the fourth coil, and the second coil electromagnetically couples with at least the third coil.

DETAILED DESCRIPTION

Figure 1A:
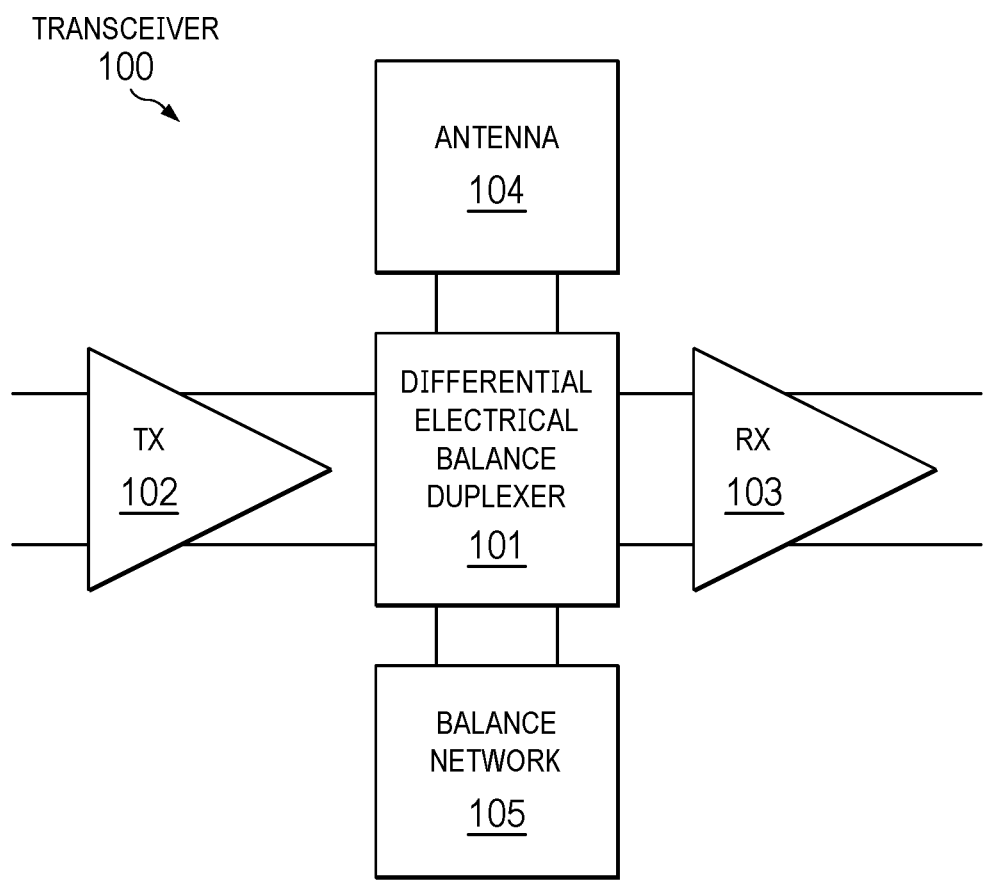
FIG. 1A illustrates a block diagram of a transceiver system that includes an electrical balance duplexer (EBD), in an example.

Electrical balance duplexers (EBDs) are described. An example EBD includes a four coil structure. The first coil is coupled to a differential transmitter (TX) port, and the second coil is coupled to a differential receiver (RX) port. The third coil is coupled to a differential antenna (ANT) port, and the fourth coil is coupled to a differential balance network (BAL) port. No physical conductor connects any of the TX, BAL or ANT ports together, so direct current (DC) isolation exists between those ports and their respective coils. Also, the first and second coils are arranged such that magnetic isolation (flux cancellation) exists between them. Accordingly, no reliance on a given TX signal being common mode to a given RX signal is necessary, unlike a conventional hybrid transformer. During a transmit operation, the first coil electromagnetically couples to the third coil to allow for signal transmission via a communication channel (e.g., antenna), and also electromagnetically couples to the fourth coil to allow for phase-based cancellation of transmit signals at the RX port. During a receive operation, the second coil electromagnetically couples to the third coil to allow for reception of signals via the communication channel (e.g., an antenna), and may also electromagnetically couple to the fourth coil. The third and fourth coils for the ANT and BAL ports, respectively, are independent of and separate from the first and second coils, thus providing a degree of freedom with respect to tuning of the balance network for a given communication channel, to improve cancellation of transmit signals at the RX port. The shape and layout of the coils can vary.

General Overview

As described above, a number of non-trivial issues remain EBDs. For example, conventional designs are either single-ended or a differential adaptation of a single-ended design, thus making them inefficient from an area and performance point of view. Also, conventional differential implementations are sub-optimal with respect to transmit/receive (TX/RX) insertion loss, owing to additional long parasitic feedline routings required to interface with the TX and/or RX conductors, to maintain the differential adaptation. Also, conventional EBDs do not provide adequate DC isolation between the transmit, balance, and antenna ports making the co-design more challenging and lowering the degrees of freedom for design/performance optimization.

Accordingly, techniques are described herein for providing EBD structures capable of providing differentiality and DC isolation. In an example, the EBD structure includes a first coil for transmitting signals (TX port) and a second coil for receiving signals (RX port), as well as a third coil (ANT port) for coupling to a communication channel and a fourth coil (BAL port) for coupling to a balance network. By symmetrically arranging the first and second coils with respect to each other, flux cancellation is achieved between the two thus isolating the transmit path from the receive path. Perfect symmetry or alignment between the two coils is not required, as further described below. Each of the third and fourth coils can be located in a turn of the first or second coil which allows them to individually electromagnetically couple to the first and second coils, while the first or second coil remain magnetically isolated from one another. Unlike the differential adaptation of a single ended design, the four independent coils of the EBD structure allow for four fully differential ports, and without inducing stray coupling due to parasitic routings attendant conventional differential adaptations. Such a four coil differential configuration allows for an additional degree of freedom from a tuning perspective as well as DC isolation between the TX, BAL and ANT ports.

The EBD structure can be implemented, for instance, in an integrated circuit. In one such example, the EBD structure includes a first coil in a first layer and coupled to a differential transmitter (TX) port, and a second coil in a second layer and coupled to a differential receiver (RX) port. The structure further includes a third coil in a third layer and coupled to a differential antenna (ANT) port, and a fourth coil in the third layer or a fourth layer and coupled to a differential balance network (BAL) port. The first coil is not directly connected to either of the third coil or the fourth coil by a physical conductive pathway, and the third coil is not directly connected to the fourth coil by a physical conductive pathway. Thus, direct current (DC) isolation exists between each of the first coil, third coil, and fourth coil. During operation, the first coil electromagnetically couples with the third coil at a first location of the first coil that overlaps the third coil. The first coil also electromagnetically couples with the fourth coil at a second location of the first coil that overlaps the fourth coil. Similarly, during operation, the second coil electromagnetically couples with the third coil at a first location of the second coil that overlaps the third coil, and also electromagnetically couples with the fourth coil at a second location of the second coil that overlaps the fourth coil.

In some such cases, one of the first coil or the second coil crosses-over itself in one or more locations so as to provide two or more non-concentric turns, and the other of the first coil or the second coil does not crossover itself. The number of crossovers and shape of the coil can vary. For instance, in one such example, the coil crosses-over itself in one location and has an 8-shape that includes a first half and a second half. The first half of the 8-shape is substantially symmetrical (same size and shape, within a tolerance acceptable to a given application) with the second half of the 8-shape, except for a feedline portion coupled to one of the first or second halves and not counting the crossover portion. In another such example, the coil crosses-over itself in three locations and has a clover-shape that includes a first quarter, a second quarter, a third quarter, and a fourth quarter. The first, second, third, and fourth quarters are substantially symmetrical (same size and shape, within a tolerance acceptable to a given application) with one another, except for crossover and feedline portions. In another such example, the coil crosses-over itself in two locations to provide a middle loop between a first outer loop and a second outer loop. In one such case, the first and second outer two loops are symmetrical with each other (e.g., same width W1, within a tolerance, such as the example case where each W1 is within 2% of a target width), and the middle loop is larger (e.g., two times W1).

The other of the first coil or the second coil may or may not have one or more cross-overs, and its shape may vary as well. In one example case, the other coil is a one loop coil having a square or rectangular shape or other perimeter that is at least partially aligned with the coil that crosses over itself. In another example case, the other coil follows a perimeter of the coil that crosses over itself, so that the two coils are even more similarly shaped and aligned. In some cases, for instance, the first coil and the second coil are substantially aligned with each other, except for respective feedline portions and any crossover portions. In other such cases, the first coil is still aligned or otherwise at least partially aligned with the second coil, but also at least partially inward or partially outward of the second coil. In this manner, perfect alignment and symmetry are not required in all examples.

A crossover of a given coil can be accomplished using the third layer or a fourth layer. In one such case, the first coil has first and second non-concentric turns and crosses-over itself between those two turns by transitioning from the first turn of the first layer to the third layer where it passes over itself and then back to the first layer to continue with the second loop. In one case, the second coil follows the perimeter of the first coil but doesn't cross over itself. In another example, wherein the first coil and the second coil are each honeycomb shaped. In one such case, the first coil crosses-over itself so as to provide two or more non-concentric turns, and the second coil crosses-over itself so as to provide two or more non-concentric turns. In other such examples, the roles of the first and second coils may be reversed.

The configuration of the third and fourth coils may also vary. In some examples, the third and fourth coils are in the same layer (e.g., the third layer) and do not overlap with each other. In one such case, the third coil is aligned with a first turn of the first (or second) coil, and the fourth coil is aligned with a second turn of the first (or second) coil. In other examples, the third coil is in the third layer and the fourth coil is in the fourth layer, and they may or may not overlap with each other, but remain DC-isolated from each other. The third and fourth coils may be single turn coils, or multi-turn coils. In one example, the third coil crosses-over itself one or more times so as to provide two or more turns, and/or the fourth coil crosses-over itself one or more times so as to provide two or more turns. In one such case, the two or more turns of the third coil are concentric turns, and the two or more turns of the fourth coil are concentric turns.

The EBD structure may be part of a communication system. In one such case, the system includes a communication channel coupled to the differential ANT port. Also, a balance network is coupled to the differential BAL port. Also, a transmitter is coupled to the differential TX port, and a receiver is coupled to the differential RX port. Such a configuration can be a node of a multi-node communication system. One or more additional nodes may also include an EBD structure and be similarly configured. The communication channel can vary from one example to the next, but in some examples includes an antenna, a rotational interface, and/or a series capacitor. To this end, any number of wireless communication links can be used.

Transceiver System

Figure 1B:
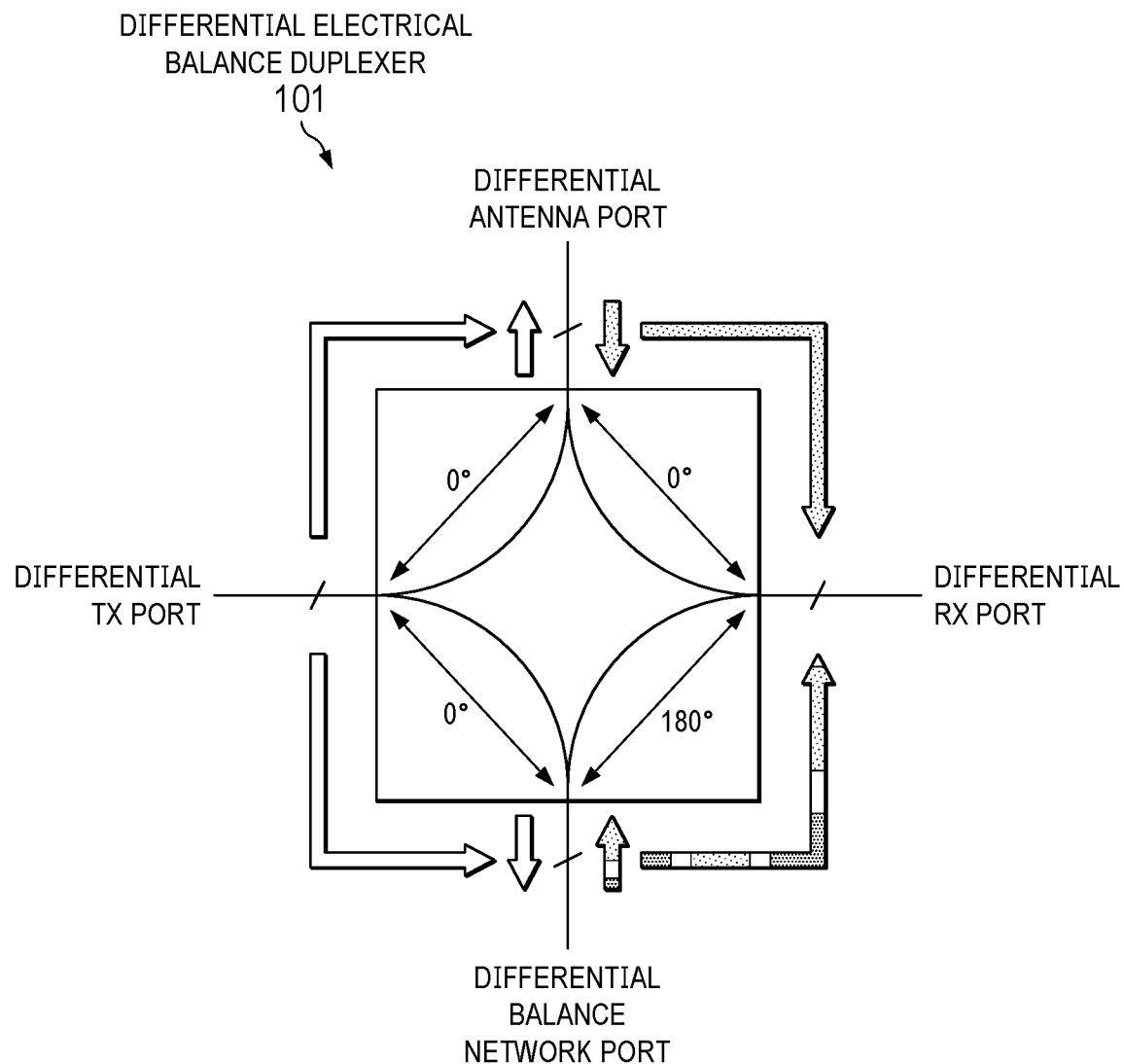
FIG. 1B illustrates structural and functional details of the EBD in FIG. 1A, in an example.

FIG. 1A illustrates a block diagram of a transceiver system 100 that includes a differential electrical balance duplexer (EBD) 101, and FIG. 1B illustrates structural and functional details of the EBD 101, in an example. As shown, the EBD 101 includes a differential transmitter (TX) port that is coupled to a differential transmitter (TX) 102, a differential receiver (RX) port that is coupled to a differential receiver (RX) 103, a differential antenna (ANT) port that is coupled to a differential antenna 104, and a differential balance (BAL) port that is coupled to a differential balance network 105. The EBD 101 allows concurrent transmission and reception via antenna 104 and in the same frequency band. In operation, a differential TX signal generated by TX 102 is applied to the differential TX port and passed to antenna 104 via the ANT port, and a differential RX signal applied to the ANT port via antenna 104 is passed to the RX port and on to RX 103. First and second representations of differential TX signals are also received at the RX port, but those representations are 180 degrees out-of-phase with one another by operation of the EBD 101 (as shown in FIG. 1B, between the BAL and RX ports) and thus largely cancel out, so as to not interfere with RX signals.

Each of TX 102 and RX 103 can be implemented with any differential transmitter and differential receiver technology, respectively. In some examples, TX 102 includes a power amplifier, and RX 103 includes a low noise amplifier (LNA). Antenna 104 can be implemented with any active or passive differential antenna technology. Example antenna configurations include monopole, dipole, and loop antennas, which may be planar or folded, and wideband or narrowband, depending on the given application. Balance network 105 can be implemented as an active or passive network to realize an impedance to match the impedance of antenna 104. The balance network 105 may include any number of tunable resistors, capacitors and/or inductors. In operation, the 180 degree phase difference between the BAL and RX ports effectively provides isolation between the TX and RX ports, while maintaining the TX-to-ANT and ANT-to-RX transmission paths, responsive to the balance network 105 impedance ($Z_{BAL}$) being sufficiently equal to the antenna impedance ($Z_{ANT}$). In some examples, $Z_{BAL}$ is tunable to within 1% or 2% of $Z_{ANT}$, although larger (e.g., 5% or 10%) or smaller (e.g., 0.5% or 0.1%) tolerances can be used, depending on the given application. In some cases, the balance condition provided by network 105 may be dynamically adjusted responsive to temperature and/or other parameters.

Thus, the balance network 105 can be used to reduce the level of interference that transmissions via the TX port can cause with respect to receive operations via the RX port. In contrast, an inbound signal received via the RX port generally doesn't cause interference with respect to transmit operations, because a given TX network generally has good reverse isolation (e.g., signals at output of transmit amplifier cannot propagate to the amplifier input); also, signals received via the RX port are generally much weaker than signals sent via the TX port.

EBD Structures

Figure 2A:
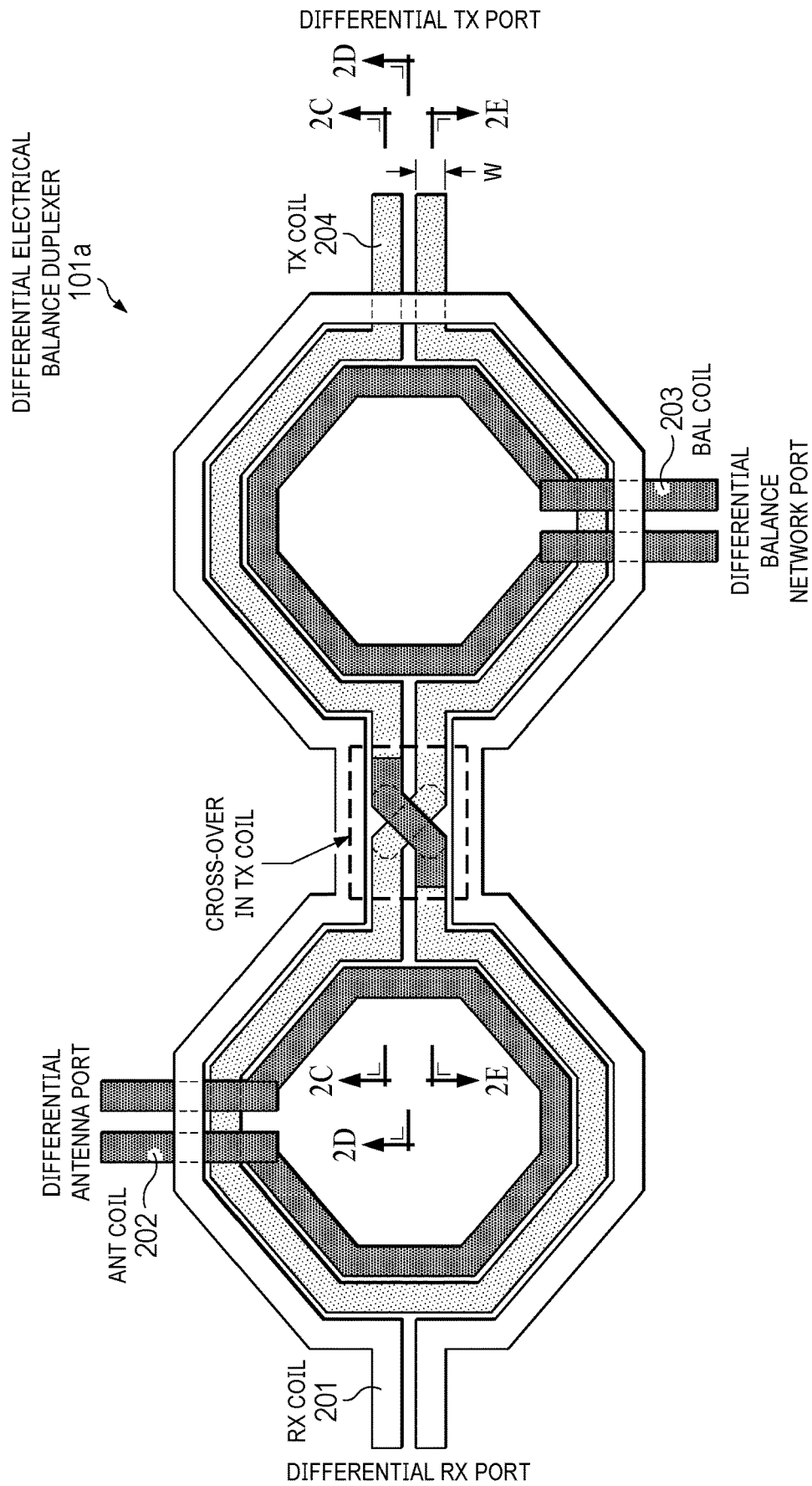
FIGS. 2A, 2C, 2D, and 2E collectively illustrate an EBD structure having a two-turn non-concentric TX coil of a first layer aligned with an 8-shaped RX coil of a second layer, each of the TX and RX coils electromagnetically coupled with one-turn ANT and BAL coils of a third layer, in an example.

FIG. 2A illustrates an EBD structure 101a having a two-turn non-concentric TX coil 204 of a first layer aligned with an 8-shaped RX coil 201 of a second layer, in an example. Each of the TX coil 204 and RX coil 201 electromagnetically couples, without direct physical conductive contact, with a one-turn ANT coil 202 and a one-turn BAL coil 203. The ANT coil 202 and BAL coil 203 do not overlap with one another and are both located in a third layer that may be between the first and second layers, although the order of the layers can vary from one example to the next, so long as the desired levels of flux cancellation (between the TX and RX coils) and electromagnetic coupling (between the TX coil and the ANT and BAL coils, and between the RX coil and the ANT and BAL coils) can be achieved.

Figure 2B:
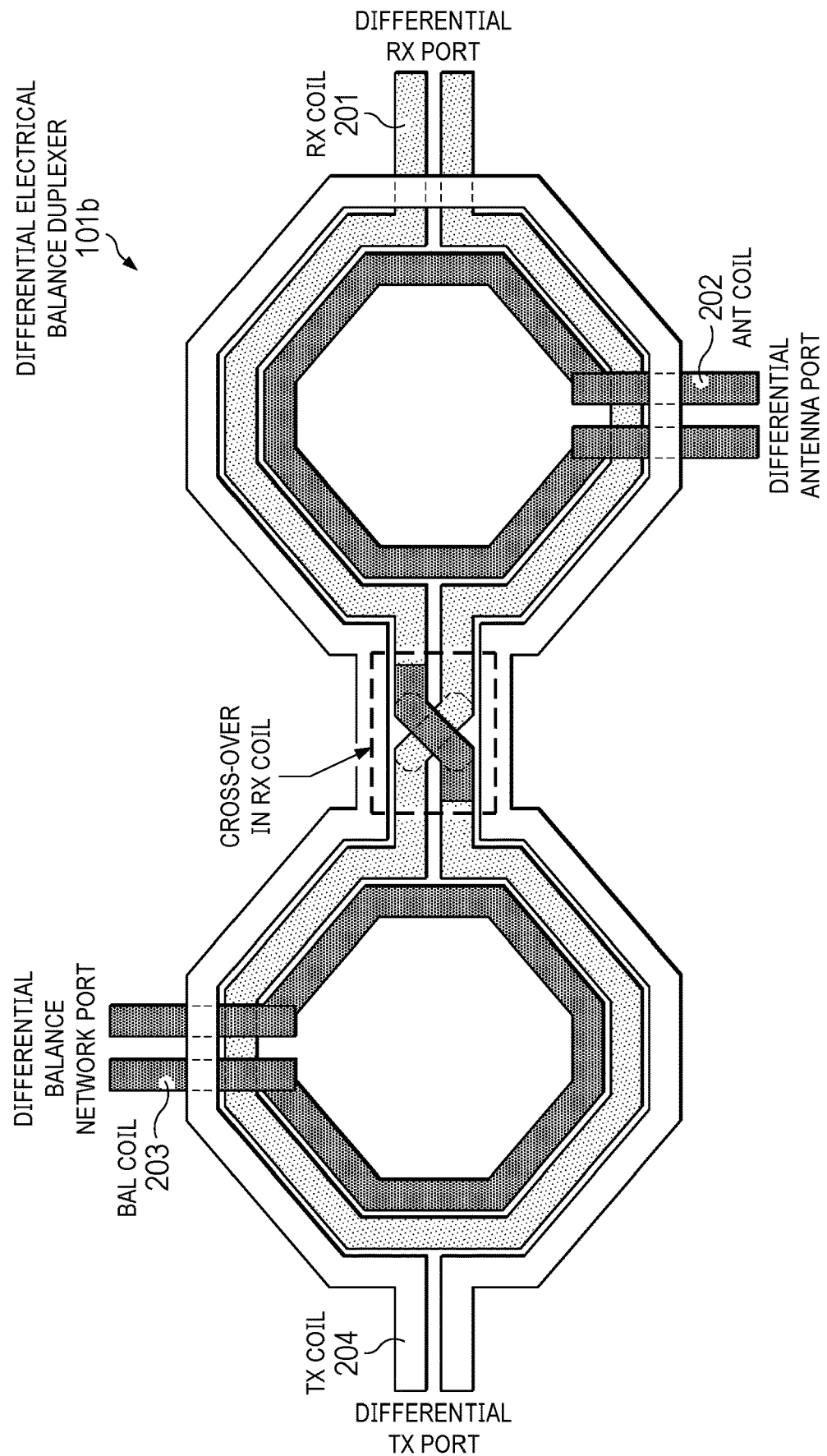
FIG. 2B illustrates an EBD structure having a two-turn non-concentric RX coil of a first layer aligned with an 8-shaped TX coil of a second layer, each of the TX and RX coils electromagnetically coupled with one-turn ANT and BAL coils of a third layer, in another example.
Figure 2C:
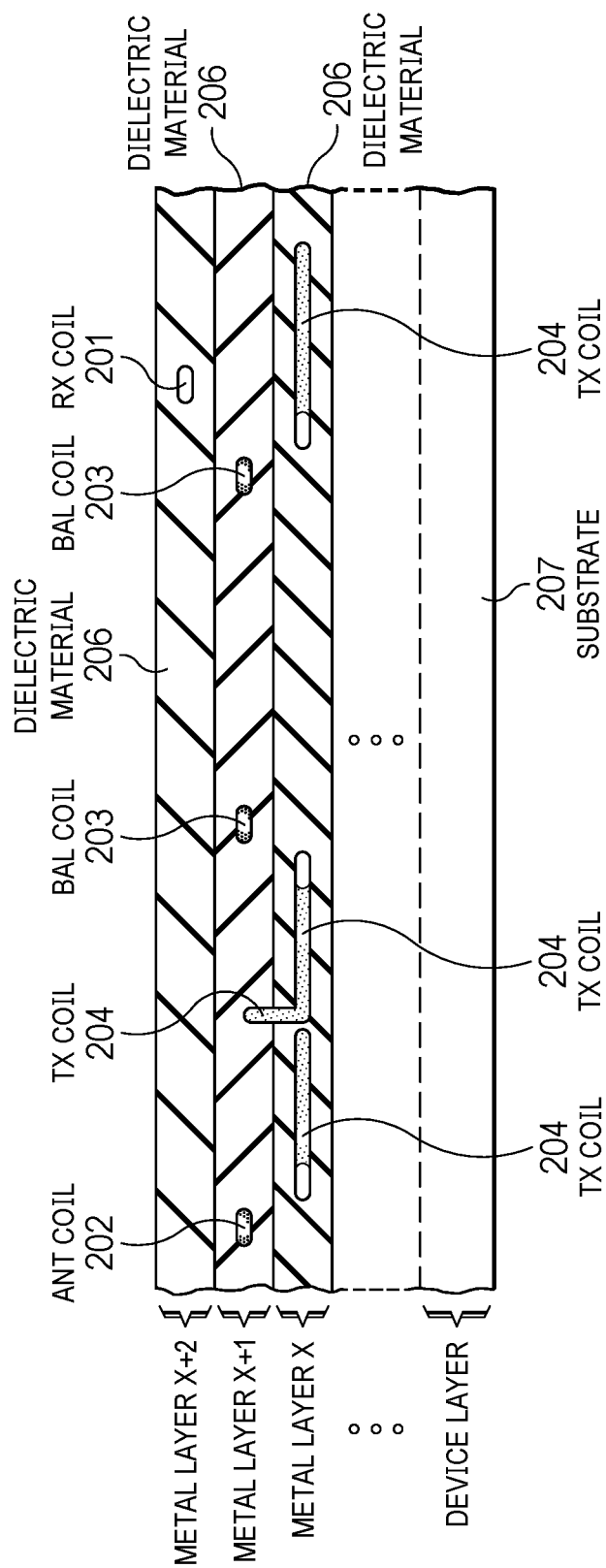
Figure 2D:
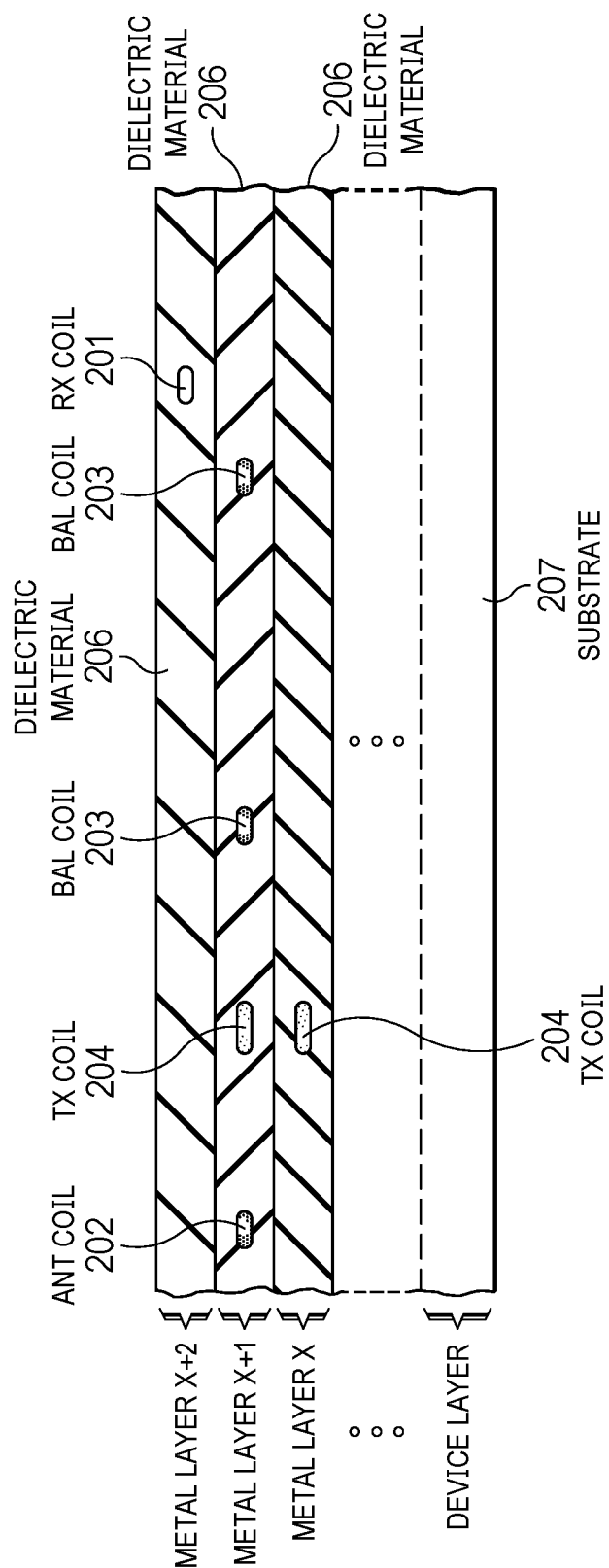
Figure 2E:
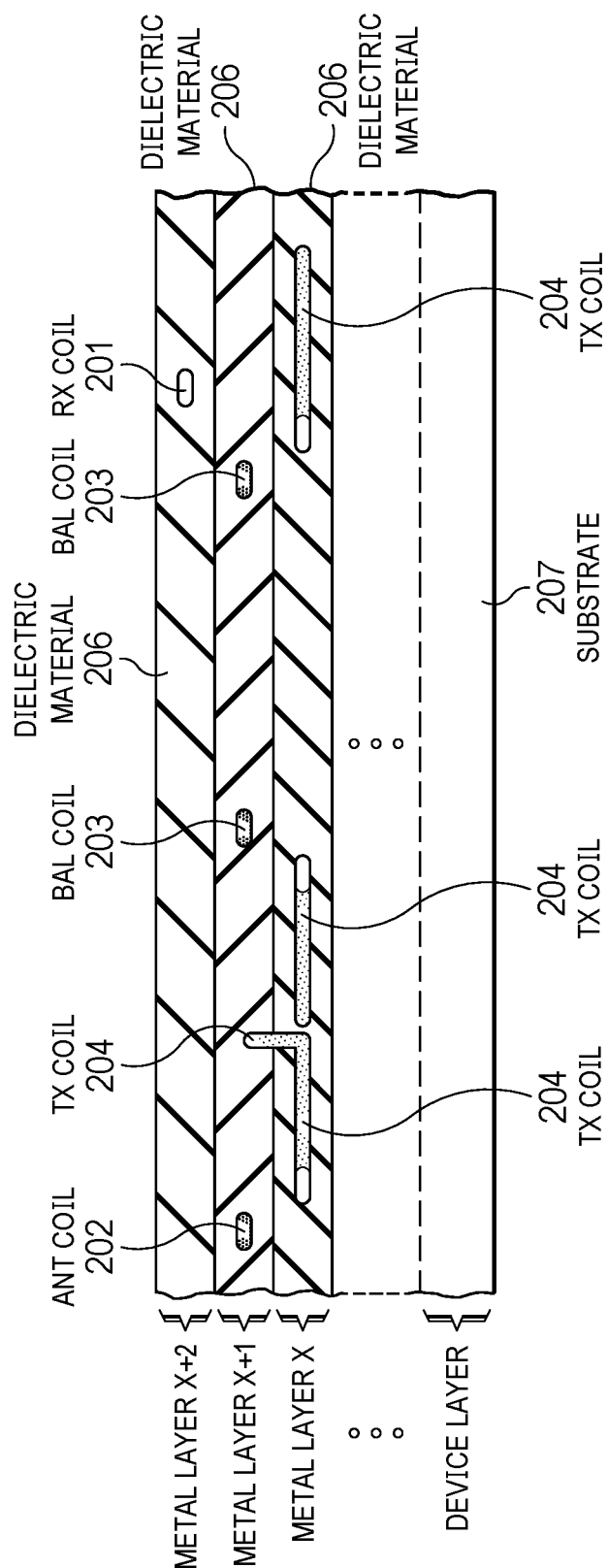

FIGS. 2C, 2D, and 2E each show a different cross-section of EBD structure 101a, taken at respective dashed lines 2C-2C, 2D-2D, and 2E-2E, as indicated in FIG. 2A, to further illustrate the various layers of the EBD structure 101*a*, which are designated as metal layers X (first layer), X+1 (third layer), and X+2 (second layer). Such cross-sections also collectively illustrate, for instance, how a crossover can be achieved, how a layer can be shared by two different coils, and how a coil of one layer can overlap with a coil of another layer.

The layers X, X+1, and X+2 can be, for example, metallization layers of an integrated circuit or die (e.g., system-on-chip or other packaged circuit) such as the so-called top metal or thick metal layers of a die formed using an RF-centric process (radio frequency centric process, such as gigahertz range operation), with each layer including a conductive coil (201, 202, 203, or 204) embedded within dielectric material 206. Unlike a hybrid transformer, using separate coils for each of TX, ANT and BAL ports without electric connection (direct conductive contact) between them eases differential implementation and also provides additional design flexibility. In the example shown, the layers are formed over a substrate 207 that includes a device layer, which may include various components and circuits, such as a transmitter circuit, a receiver circuit, and a filter circuit, to name a few examples.

The TX coil 204 crosses over itself in one location (as highlighted in the dashed box of FIG. 2A), by extending from the first layer into the third layer and passing over itself (or under itself, depending on orientation of structure) and then extending back from the third layer to the first layer. For example: FIG. 2E shows the TX coil 204 extending vertically from layer X into layer X+1 (which can be accomplished, for instance, with a conductive via); FIG. 2D shows the TX coil 204 passing over itself; and FIG. 2C shows the TX coil 204 extending back from layer X+1 to layer X (which again can be accomplished, for instance, with a conductive via).

Figure 3A:
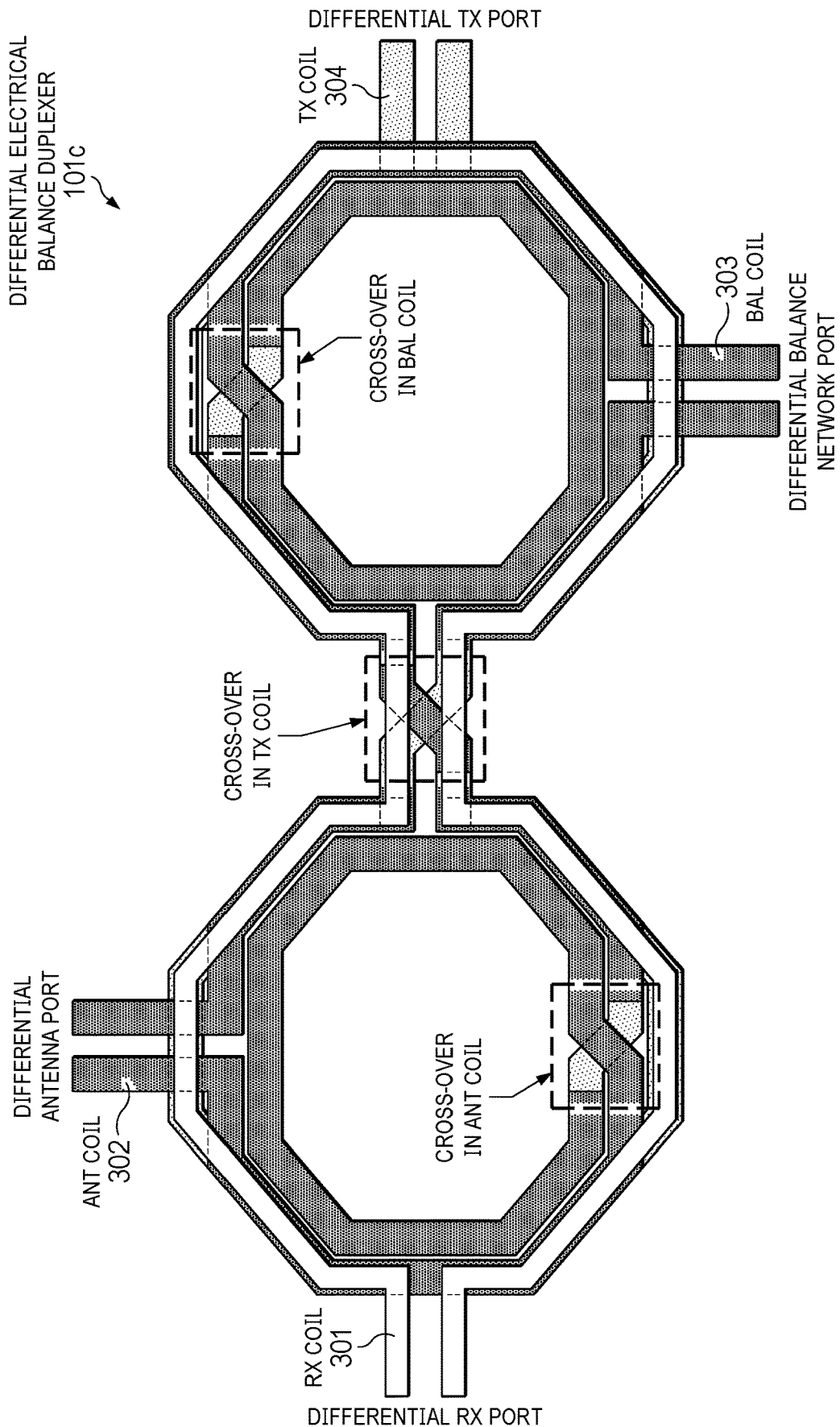
FIG. 3A illustrates an EBD structure having a two-turn non-concentric TX coil of a first layer aligned with an 8-shaped RX coil of a second layer, each of the TX and RX coils electromagnetically coupled with two-turn ANT and BAL coils of a third layer, in another example.
Figure 3B:
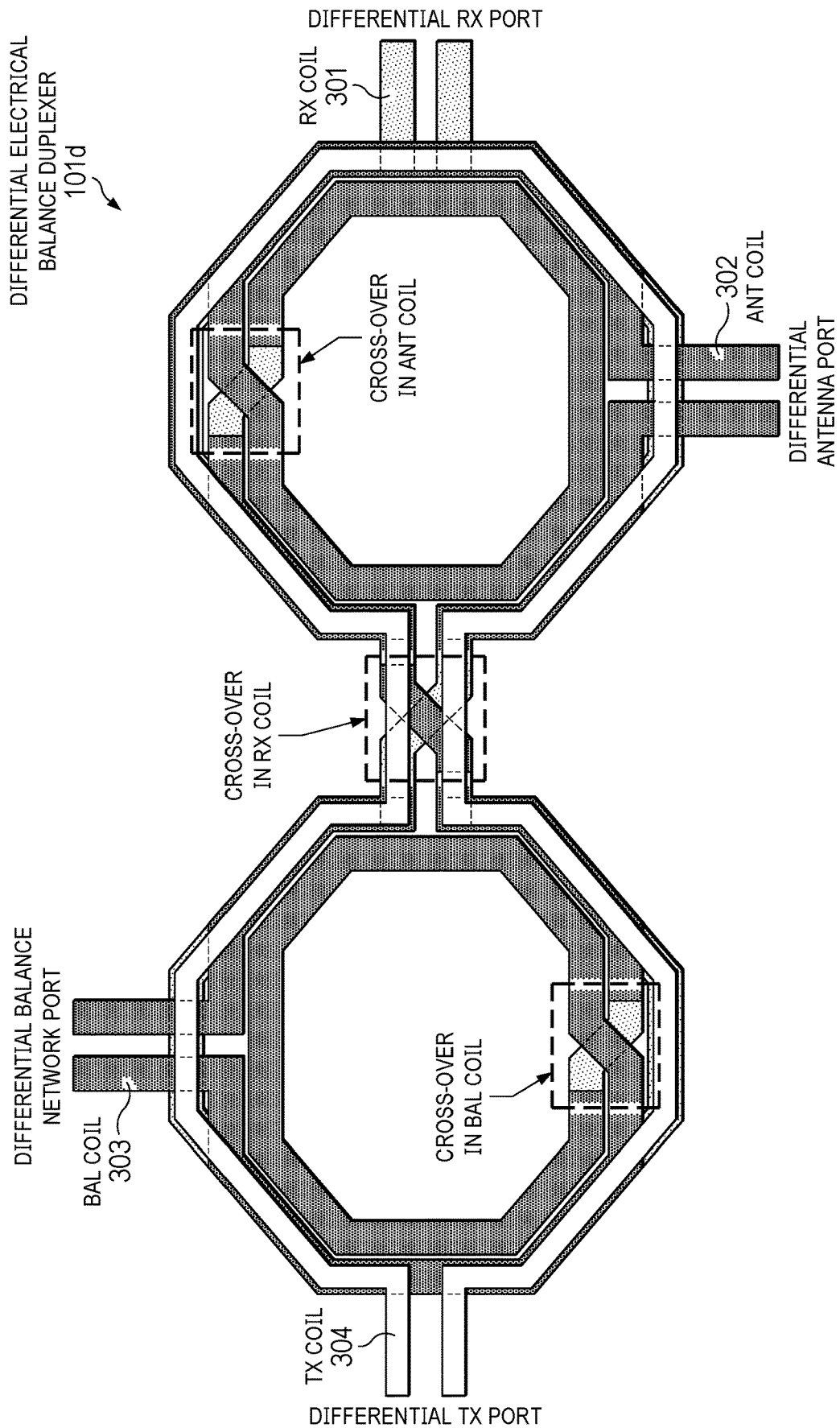
FIG. 3B illustrates an EBD structure having a two-turn non-concentric RX coil of a first layer aligned with an 8-shaped TX coil of a second layer, each of the TX and RX coils electromagnetically coupled with two-turn ANT and BAL coils of a third layer, in another example.

With further reference to FIG. 2A, the RX coil 201 is symmetrically aligned with the TX coil 204, and follows the perimeter of the TX coil 204. In this example, the RX coil 201 is outward of the TX coil 204, such that the inner perimeter of the RX coil 201 is substantially aligned with the outer perimeter of the TX coil 204. In some such examples, the inner perimeter of RX coil 201 is directly over (or under) the outer perimeter of TX coil 204, or within 0.01 to 3 microns (μm) of the outer perimeter of TX coil 204. The tolerance on alignment may vary depending on factors such as size of coils (larger coils may allow for larger tolerance) and desired degree of flux cancellation. FIGS. 3A-B show an example where the TX and RX coils are more directly aligned with each other, rather than one being inward or outward of the other.

With further reference to FIG. 2A, the TX coil 204 includes a left half to the left of the crossover, and a right half to the right of the crossover, to provide first and second turns of the TX coil 204. The left and right halves are symmetrical with each other, with respect to both size and shape, except for the feedline portion that couples the right half to the differential TX port. The RX coil 201 has no crossover but has similar, slightly larger left and right halves, given that it is outward of the TX coil 204 and follows the outer perimeter of the TX coil 204, as described above. The left and right halves of the RX coil 201 are symmetrical with each other, with respect to both size and shape, except for the feedline portion that couples the left half to the differential RX port. Such a symmetrical arrangement allows the RX coil 201 and the TX coil 204 to avoid coupling, through flux cancellation in the aligned coil halves. For example, the current flow direction in the left half of the RX coil 201 is counter-clockwise, while the current flow direction in the left half of the TX coil 204 is clockwise, so flux is in opposite direction. In contrast, the current flow direction in the right half of the RX coil 201 is counter-clockwise, as is the current flow direction in the right half of the TX coil 204, so flux is in the same direction.

With further reference to FIG. 2A, the ANT coil 202 is located in the left half or turn of the TX coil 204 and the BAL coil 203 is located in the right half or turn of the TX coil 204, which allows each of the ANT coil 202 and BAL coil 203 to separately and electromagnetically couple to the RX coil 201 and TX coil 204 without any cancellation, while the RX coil 201 and TX coil 204 remain isolated from one another. In this example, the ANT coil 202 is inward of the TX coil 204, such that the outer perimeter of the ANT coil 202 is substantially aligned with the inner perimeter of the left half of TX coil 204; likewise, the BAL coil 203 is inward of the TX coil 204, such that the outer perimeter of the BAL coil 203 is substantially aligned with the inner perimeter of the right half of TX coil 204. In some such examples, the outer perimeter of the ANT coil 202 is directly over (or under) the inner perimeter of the left half of TX coil 204, or within 0.01 μm to 3 μm of the inner perimeter of the left half of TX coil 204. Similarly, the outer perimeter of the BAL coil 203 is directly over (or under) the inner perimeter of the right half of TX coil 204, or within 0.01 μm to 3 μm of the inner perimeter of the right half of TX coil 204. As shown, the size and shape of the ANT coil 202 and the BAL coil 203 are substantially the same (within a tolerance acceptable to the given application), but they are oriented to facilitate ANT and BAL ports that are arranged away from each other, in this example. The configuration of the feedline portion of each ANT coil 202 and BAL coil 203 can vary from one example to the next, but in this example case, the feedline portions extend straight from the main body of the coil to the corresponding differential port.

Each of the four coils 201, 202, 203 and 204 has a width W, as generally shown with respect to TX coil 204 in FIG. 2A. Also, each of the four coils 201, 202, 203 and 204 has a thickness (into and out of the page) as well as a length (from one end of the coil to the other end of the coil). The length may include any number of distinct conductive segments (one or more), each segment having a width W and thickness. These coil dimensions can vary from one example, as can the spacing between the coils in their respective layers, depending on the given application and desired coupling, including factors such as center frequency. In some example embodiments, these coil dimensions and spacings are in the micron range or sub-micron range, and the center frequency is in the radio frequency (RF) band, such as in the megahertz (MHz) range or gigahertz (GHz) range. In some cases, the coil of one layer may have different dimensions than the dimensions of a coil of another layer. More generally, the techniques described herein are suitable for any particular range of coil dimensions or frequency range of operation.

In one example EBD structure formed in the top metal layers of an integrated circuit using an RF-centric process, and having a center frequency of about 16 GHz and a bandwidth of about 4 GHz, the RX coil 201 may have a width and a thickness each of about 0.5 μm to 1.5 μm (e.g., 1.0 μm to 1.3 μm, such as 1.2 μm), and the TX coil 204 may have a width and a thickness each of about 0.5 μm to 2.0 μm (e.g., 1.3 μm to 1.7 μm, such as 1.5 μm), and each of the ANT coil 202 and BAL coil 203 may have a width and a thickness each similar to that of the TX coil. The length of each coil depends on factors such as the number of turns and the degree of alignment between the coils, but in some cases is in the range of about a few to several hundred millimeters (mm). In some such examples, vertical spacing between the TX coil 204 and the ANT coil 202 is in the range of about 0.5 µm to 1.5 µm, such as the specific example case where the lower surface of ANT coil 202 of the middle layer (X) is about 0.8 µm to 1.0 µm from the upper surface of TX coil 204 of the lower layer (X−1). Similar spacing can be provided between the TX coil 204 and the BAL coil 203, which is also in the middle layer (X) in this example. In some such example cases, the vertical spacing between the RX coil 201 and the ANT coil 202 is also in the range of about 0.5 µm to 1.5 µm, such as the specific example case where the upper surface of ANT coil 202 of the middle layer (X) is about 0.7 µm to 0.9 µm from the lower surface of TX coil 204 of the upper layer (X+1). Similar spacing can be provided between the RX coil 201 and the BAL coil 203. Again, the order of the layers and the related dimensions may vary from one example to the next, and the techniques described herein can be applied to any such variations.

The coils 201, 202, 203, and 204 can be implemented with any number of conductive materials, such as copper, silver, titanium, or aluminum. In some examples, dielectric material such as an oxide (e.g., silicon oxide) can be used to offset the coil of one layer from the coil of another layer. Etch stop layers may be provisioned between metallization layers. Any number of patterning techniques can be used to form each of the coils 201, 202, 203, and 204 within a corresponding layer of dielectric material.

FIG. 2B illustrates an EBD structure 101b similar to the example of FIG. 2A, except that the TX and RX coils have been switched, as have the ANT and BAL coils. The above and below relevant description equally applies here, with respect to the various functional and structural commonalities with the other EBD structures described above and below, including, for instance, structural details such as those with respect to metallization layers, crossovers, symmetrical arrangement of the TX and RX coils to achieve flux cancellation, and the location of the ANT and BAL coils in different turns of the TX and/or RX coils (or different layers) and thus allowing them to individually couple to the TX and RX coils.

The RX coil 201 crosses over itself in one location (as highlighted in the dashed box of FIG. 2B), by extending from the first layer into the third layer and passing over itself (or under itself, depending on orientation of structure) and then extending back from the third layer to the first layer. The TX coil 204 is symmetrically aligned with the RX coil 201, and follows the perimeter of the RX coil 201. In this example, the TX coil 204 is outward of the RX coil 201, such that the inner perimeter of the TX coil 204 is substantially aligned with the outer perimeter of the RX coil 201. In some such examples, the inner perimeter of TX coil 204 is directly over (or under) the outer perimeter of RX coil 201, or within 0.01 µm to 3 µm of the outer perimeter of TX coil 204.

The RX coil 201 includes a left half to the left of the crossover, and a right half to the right of the crossover, to provide first and second turns of the RX coil 201. The left and right halves are symmetrical with each other, with respect to both size and shape, except for the feedline portion that couples the right half to the differential RX port. The TX coil 204 has no crossover but has similar, slightly larger left and right halves, given that it is outward of the RX coil 201 and follows the outer perimeter of the RX coil 201, as described above. The left and right halves of the TX coil 204 are symmetrical with each other, with respect to both size and shape, except for the feedline portion that couples the left half to the differential TX port. As described above with respect to the example of FIG. 1A, such a symmetrical arrangement allows the RX coil 201 and the TX coil 204 to avoid coupling, through flux cancellation in the aligned coil halves.

The ANT coil 202 is located in the right half or turn of the RX coil 201 and the BAL coil 203 is located in the left half or turn of the RX coil 201, which allows each of the ANT coil 202 and BAL coil 203 to separately and electromagnetically couple to the RX coil 201 and TX coil 204 without any cancellation, while the RX coil 201 and TX coil 204 remain isolated from one another. In this example, the ANT coil 202 is inward of the RX coil 201, such that the outer perimeter of the ANT coil 202 is substantially aligned with the inner perimeter of the right half of RX coil 201; likewise, the BAL coil 203 is inward of the RX coil 201, such that the outer perimeter of the BAL coil 203 is substantially aligned with the inner perimeter of the left half of RX coil 201. In some such examples, the outer perimeter of the ANT coil 202 is directly over (or under) the inner perimeter of the right half of RX coil 201, or within 0.01 µm to 3 µm of the inner perimeter of the right half of RX coil 201. Similarly, the outer perimeter of the BAL coil 203 is directly over (or under) the inner perimeter of the left half of RX coil 201, or within 0.01 µm to 3 µm of the inner perimeter of the left half of RX coil 201.

FIG. 3A illustrates an EBD structure 101c similar to the example of FIG. 2A, except that the TX and RX coils are more vertically aligned with one another rather than the RX coil being outward of the TX coil, and the ANT and BAL coils each include multiple turns. The above and below relevant description equally applies here, with respect to the various functional and structural commonalities with the other EBD structures described above and below.

In more detail, each of the TX coil 304 (first layer) and RX coil 301 (second layer) electromagnetically couples, without direct physical conductive contact, with a two-turn ANT coil 302 and a two-turn BAL coil 303. The ANT coil 302 and BAL coil 303 do not overlap with one another and both can be located in a third layer, as variously described above. As shown, the size and shape of the ANT coil 302 and the BAL coil 303 are substantially the same, but they are oriented to facilitate ANT and BAL ports that are arranged away from each other, in this example. The configuration of the feedline portion of each ANT coil 302 and BAL coil 303 can vary from one example to the next, but in this example case, the feedline portions extend straight from the main body of the coil to the corresponding differential port.

The TX coil 304 crosses over itself in one location (as highlighted in the dashed box in the center of FIG. 3A), by extending from the first layer into the third layer and passing over itself (or under itself, depending on orientation of structure) and then extending back from the third layer to the first layer. The RX coil 301 is symmetrically aligned with the TX coil 304, and follows the perimeter of the TX coil 304. In this example, the RX coil 301 is directly aligned with the TX coil 304, such that the inner perimeter of the RX coil 301 is substantially aligned with the inner perimeter of the TX coil 304, and the outer perimeter of the RX coil 301 is substantially aligned with the outer perimeter of the TX coil 304. Perfect alignment is not required, and direct alignment of the TX and RX coils may be considered achieved if an imaginary vertical plane passes through both the RX coil 301 and TX coil 304, for each segment of those two coils, except for deviations such as crossover and feedline portions. In other examples, less than direct alignment of all segments, such as substantial alignment, may be acceptable if sufficient flux cancellation between the RX and TX coils is achieved.

The TX coil 304 includes a left half to the left of the crossover, and a right half to the right of the crossover, to provide first and second turns of the TX coil 304. The left and right halves are symmetrical with each other, with respect to both size and shape, except for the feedline portion that couples the right half to the differential TX port. The RX coil 301 has no crossover but has similar left and right halves, given that it is directly aligned with TX coil 304, as described above. The left and right halves of the RX coil 301 are symmetrical with each other, with respect to both size and shape, except for the feedline portion that couples the left half to the differential RX port. Such a symmetrical arrangement allows the RX coil 301 and the TX coil 304 to avoid coupling, through flux cancellation in the aligned coil halves.

The ANT coil 302 is located in the left half or turn of the TX coil 304 and the BAL coil 303 is located in the right half or turn of the TX coil 304, which allows each of the ANT coil 302 and BAL coil 303 to separately and electromagnetically couple to the RX coil 301 and TX coil 304 without any cancellation, while the RX coil 301 and TX coil 304 remain isolated from one another. In this example, the ANT coil 302 includes two concentric turns and crosses over itself in one location (as highlighted in the dashed box on the left side of FIG. 3A), by extending from the third layer into the first layer and passing over itself (or under itself, depending on orientation of structure) and then extending back from the first layer to the third layer. The outer turn of the ANT coil 302 is directly aligned with each of the RX and TX coils, and the inner turn of the ANT coil 302 is inward of the RX and TX coils, such that the outer perimeter of the inner turn of the ANT coil 302 is substantially aligned with the inner perimeter of the left half of TX coil 304 and/or RX coil 301. Likewise, the BAL coil 303 includes two concentric turns and crosses over itself in one location (as highlighted in the dashed box on the right side of FIG. 3A), by extending from the third layer into the first layer and passing over itself (or under itself, depending on orientation of structure) and then extending back from the first layer to the third layer. The outer turn of the BAL coil 303 is directly aligned with each of the RX and TX coils, and the inner turn of the BAL coil 303 is inward of the RX and TX coils, such that the outer perimeter of the inner turn of the BAL coil 303 is substantially aligned with the inner perimeter of the right half of TX coil 304 and/or RX coil 301. Substantial alignment need not be perfect alignment but also includes alignment within an acceptable tolerance, such as when corresponding segments of two coils are within 0.01 μm to 3 μm of each, or some other appropriate tolerance, giving consideration to factors of the given application such as desired degree of electromagnetic coupling, size and spacing of coils, and signal frequency and transmit power.

FIG. 3B illustrates an EBD structure 101d similar to the example of FIG. 3A, except that the TX and RX coils have been switched, as have the ANT and BAL coils. The above and below relevant description equally applies here, with respect to the various functional and structural commonalities with the other EBD structures described above and below.

The RX coil 301 crosses over itself in one location (as highlighted in the dashed box in the center of FIG. 3B), by extending from the first layer into the third layer and passing over itself (or under itself, depending on orientation of structure) and then extending back from the third layer to the first layer. The TX coil 304 is symmetrically aligned with the RX coil 301, and follows the perimeter of the RX coil 301. In this example, the RX coil 301 is directly aligned with the TX coil 304, such that the inner perimeter of the RX coil 301 is substantially aligned with the inner perimeter of the TX coil 304, and the outer perimeter of the RX coil 301 is substantially aligned with the outer perimeter of the TX coil 304. As described above, perfect alignment is not required, and direct alignment of the TX and RX coils may be considered achieved if an imaginary vertical plane passes through both the RX coil 301 and TX coil 304, for each segment of those two coils, except for deviations such as crossover and feedline portions. In other examples, less than direct alignment of all segments, may be acceptable if sufficient flux cancellation between the RX and TX coils is achieved.

The RX coil 301 includes a left half to the left of the crossover, and a right half to the right of the crossover, to provide first and second turns of the RX coil 301. The left and right halves are symmetrical with each other, with respect to both size and shape, except for the feedline portion that couples the right half to the differential RX port. The TX coil 304 has no crossover but has similar left and right halves, given that it is directly aligned with the RX coil 301, as described above. The left and right halves of the TX coil 304 are symmetrical with each other, with respect to both size and shape, except for the feedline portion that couples the left half to the differential TX port. Such a symmetrical arrangement allows the RX coil 301 and the TX coil 304 to avoid coupling, through flux cancellation in the aligned coil halves.

The ANT coil 302 is located in the right half or turn of the RX coil 301 and the BAL coil 303 is located in the left half or turn of the RX coil 301, which allows each of the ANT coil 302 and BAL coil 303 to separately and electromagnetically couple to the RX coil 301 and TX coil 304 without any cancellation, while the RX coil 301 and TX coil 304 remain isolated from one another. In this example, the ANT coil 302 includes two concentric turns and crosses over itself in one location (as highlighted in the dashed box on the right side of FIG. 3B), by extending from the third layer into the first layer and passing over itself (or under itself, depending on orientation of structure) and then extending back from the first layer to the third layer. The outer turn of the ANT coil 302 is directly aligned with each of the RX and TX coils, and the inner turn of the ANT coil 302 is inward of the RX and TX coils, such that the outer perimeter of the inner turn of the ANT coil 302 is substantially aligned with the inner perimeter of the right half of TX coil 304 and/or RX coil 301. Likewise, the BAL coil 303 includes two concentric turns and crosses over itself in one location (as highlighted in the dashed box on the left side of FIG. 3B), in a similar fashion to that described above. The outer turn of the BAL coil 303 is directly aligned with each of the RX and TX coils, and the inner turn of the BAL coil 303 is inward of the RX and TX coils, such that the outer perimeter of the inner turn of the BAL coil 303 is substantially aligned with the inner perimeter of the left half of TX coil 304 and/or RX coil 301. As described above, substantial alignment includes alignment or spatial arrangement within an acceptable tolerance, such as when a desired or otherwise acceptable level of electromagnetic coupling is achieved between the ANT coil 302 and the TX and RX coils, and between the BAL coil 303 and the TX and RX coils, for a given application. In some example cases, coils having dimensions in the micron range may have tolerances in the micron range; similarly, coils having dimensions in the nanometer range may have tolerances in the nanometer range; and so on. Such tolerancing can vary from one example to the next.

Figure 4A:
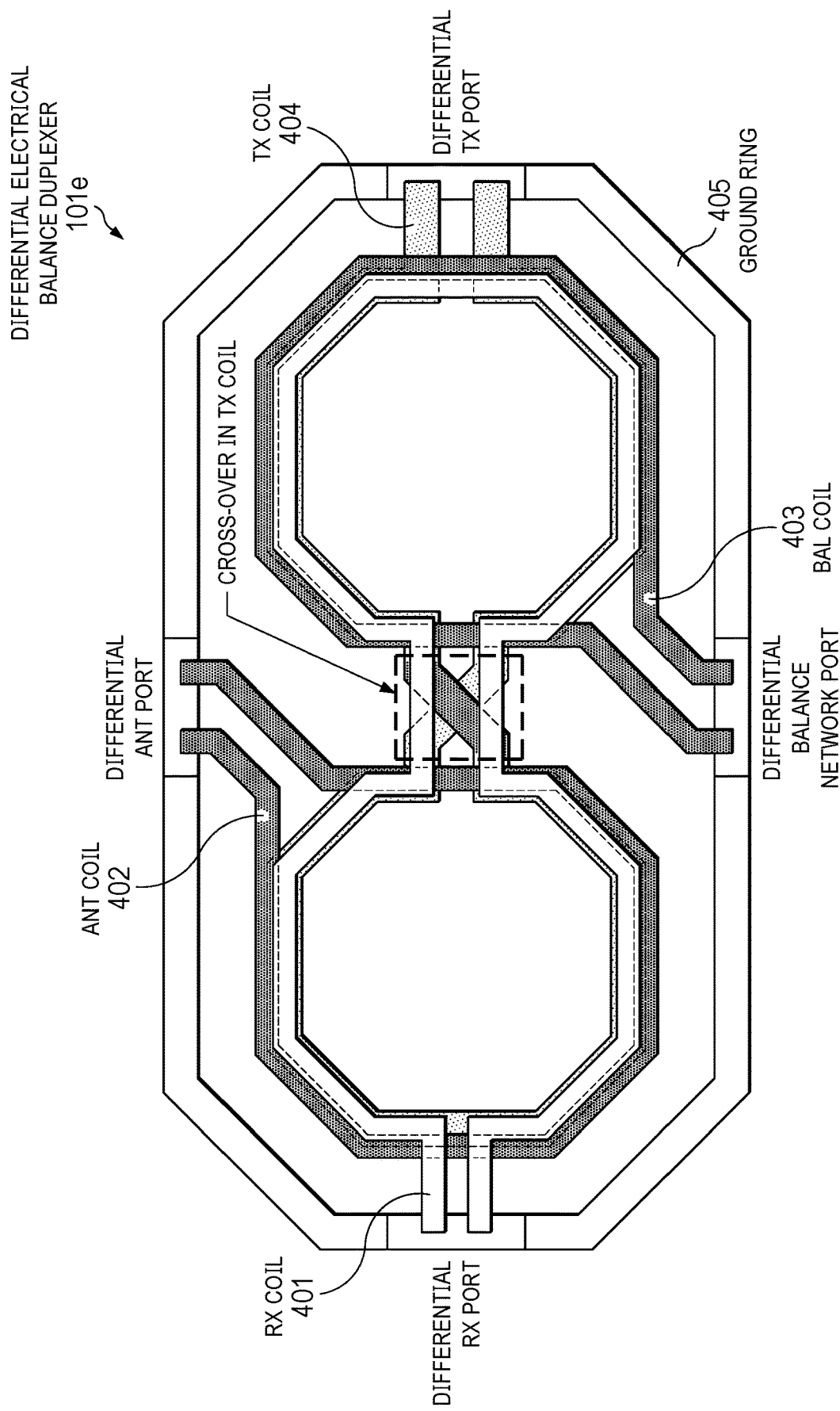
FIG. 4A illustrates an EBD structure having a two-turn non-concentric TX coil of a first layer aligned with an 8-shaped RX coil of a second layer, each of the TX and RX coils electromagnetically coupled with one-turn ANT and BAL coils of a third layer, in another example.

FIG. 4A illustrates an EBD structure 101e similar to the example of FIG. 3A, except that it includes a ground ring 405 and the ANT and BAL coils are each configured with a single turn and an offset feedline. The above and below relevant description equally applies here, with respect to the various functional and structural commonalities with the other EBD structures described above and below.

In more detail, each of the TX coil 404 (first layer) and RX coil 401 (second layer) electromagnetically couples, without direct physical conductive contact, with a one-turn ANT coil 402 and a one-turn BAL coil 403. The ANT coil 302 and BAL coil 303 do not overlap with one another and both can be located in a third layer that is between the first and second layers, as described above. As shown, the size and shape of the ANT coil 402 and the BAL coil 403 are substantially the same, but they are oriented to facilitate ANT and BAL ports that are arranged away from each other, in this example. The configuration of the feedline portion of each ANT coil 402 and BAL coil 403 can vary from one example to the next, but in this example case, the feedline portions include first segments that extend at an angle from the main body of the coil and second segments that extend straight from corresponding ends of the first segments to the corresponding differential port. Like the other examples described above, the feedline portions of the ANT coil 402 and BAL coil 403 are symmetrical as well. In other examples, the feedline portions of these coils may not be symmetrical.

The TX coil 404 crosses over itself in one location (as highlighted in the dashed box in the center of FIG. 4A), as described above. The RX coil 401 is symmetrically aligned with the TX coil 404, and follows the perimeter of the TX coil 404. In this example, the RX coil 401 is directly aligned with the TX coil 404, such that the inner perimeter of the RX coil 401 is substantially aligned with the inner perimeter of the TX coil 404, and the outer perimeter of the RX coil 401 is substantially aligned with the outer perimeter of the TX coil 404. As described above, perfect alignment is not required between the TX and RX coils, as long as sufficient flux cancellation between the RX and TX coils is achieved. In other such examples, one coil may be inward or outward of the other (such as shown in FIGS. 2A-B).

The TX coil 404 includes a left half to the left of the crossover, and a right half to the right of the crossover, to provide first and second turns of the TX coil 404. The left and right halves are symmetrical with each other, with respect to both size and shape, except for the feedline portion that couples the right half to the differential TX port. The RX coil 401 has no crossover but has similar left and right halves, given that it is directly aligned with TX coil 404, as described above. The left and right halves of the RX coil 401 are symmetrical with each other, with respect to both size and shape, except for the feedline portion that couples the left half to the differential RX port. Such a symmetrical arrangement allows the RX coil 401 and the TX coil 404 to avoid coupling, through flux cancellation in the aligned coil halves.

The ANT coil 402 is aligned with the left half or turn of the TX and RX coils and the BAL coil 403 is located in the right half or turn of the TX coil 404, which allows each of the ANT coil 402 and BAL coil 403 to separately and electromagnetically couple to the RX coil 401 and TX coil 404 without any cancellation, while the RX coil 401 and TX coil 404 remain isolated from one another. In this example, the single turn of the ANT coil 402 is slightly outward of the left half of each of the RX and TX coils, so as to partially overlap with the RX and TX coils (such that at least one imaginary vertical plane passes through each of ANT, RX, and TX coils). Likewise, the single turn of the BAL coil 403 is slightly outward of the right half of each of the RX and TX coils, so as to partially overlap with the RX and TX coils (such that at least one imaginary vertical plane passes through each of BAL, RX, and TX coils). Again, the degree of alignment between the ANT coil 402 and the TX and RX coils, as well as the degree of alignment between the BAL coil 403 and the TX and RX coils, can vary from one embodiment to the next, based on factors such as the desired degree of electromagnetic coupling for the BAL and ANT ports, size and spacing of the four coils, and signal frequency and transmit power.

Figure 4B:
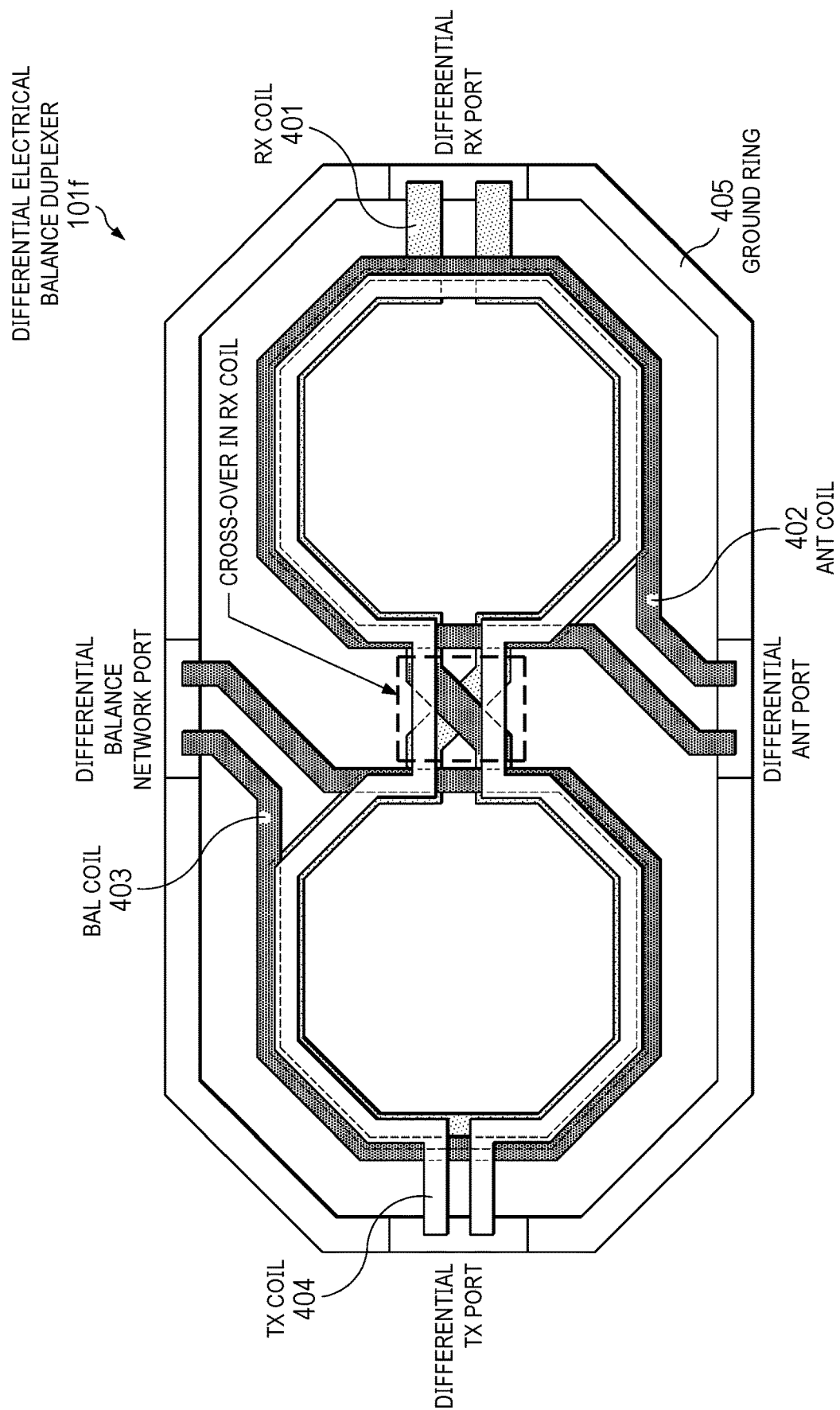
FIG. 4B illustrates an EBD structure having a two-turn non-concentric RX coil of a first layer aligned with an 8-shaped TX coil of a second layer, each of the TX and RX coils electromagnetically coupled with one-turn ANT and BAL coils of a third layer, in an example.

FIG. 4B illustrates an EBD structure 101f similar to the example of FIG. 4A, except that the TX and RX coils have been switched, as have the ANT and BAL coils. The above and below relevant description equally applies here, with respect to the various functional and structural commonalities with the other EBD structures described above and below. The RX coil 401 crosses over itself in one location as described above with respect to the TX coil, for instance. The TX coil 404 is symmetrically aligned with the RX coil 401, and follows the perimeter of the RX coil 401. In this example, the RX coil 401 is directly aligned with the TX coil 404, such that the inner perimeter of the RX coil 401 is substantially aligned with the inner perimeter of the TX coil 404, and the outer perimeter of the RX coil 401 is substantially aligned with the outer perimeter of the TX coil 404. As described above, perfect alignment is not required, and the degree of alignment between the TX and RX coils can vary from one example to the next, so long as sufficient flux cancellation between the RX and TX coils can be achieved for a given application.

The RX coil 401 includes a left half to the left of the crossover, and a right half to the right of the crossover, to provide first and second turns of the RX coil 401. The left and right halves are symmetrical with each other, with respect to both size and shape, except for the feedline portion that couples the right half to the differential RX port. The TX coil 404 has no crossover but has similar left and right halves, given that it is directly aligned with the RX coil 401. The left and right halves of the TX coil 404 are symmetrical with each other, with respect to both size and shape, except for the feedline portion that couples the left half to the differential TX port. Such a symmetrical arrangement allows the RX coil 401 and the TX coil 404 to avoid coupling, through flux cancellation in the aligned coil halves, as described above.

The ANT coil 402 is located in the right half or turn of the RX coil 401 and the BAL coil 403 is located in the left half or turn of the RX coil 401, which allows each of the ANT coil 402 and BAL coil 403 to separately and electromagnetically couple to the RX coil 401 and TX coil 404 without any cancellation, while the RX coil 401 and TX coil 404 remain isolated from one another. In this example, the single turn of the ANT coil 402 is slightly outward of the right half of each of the RX and TX coils, so as to partially overlap with the RX and TX coils (such that at least one imaginary vertical plane passes through each of ANT, RX, and TX coils). Likewise, the single turn of the BAL coil 403 is slightly outward of the left half of each of the RX and TX coils, so as to partially overlap with the RX and TX coils (such that at least one imaginary vertical plane passes through each of BAL, RX, and TX coils). Again, the degree of alignment between the ANT coil 402 and the TX and RX coils, as well as the degree of alignment between the BAL coil 403 and the TX and RX coils, can vary from one embodiment to the next, based on factors such as the desired degree of electromagnetic coupling for the BAL and ANT ports, size and spacing of the four coils, and signal frequency and transmit power.

Figure 5A:
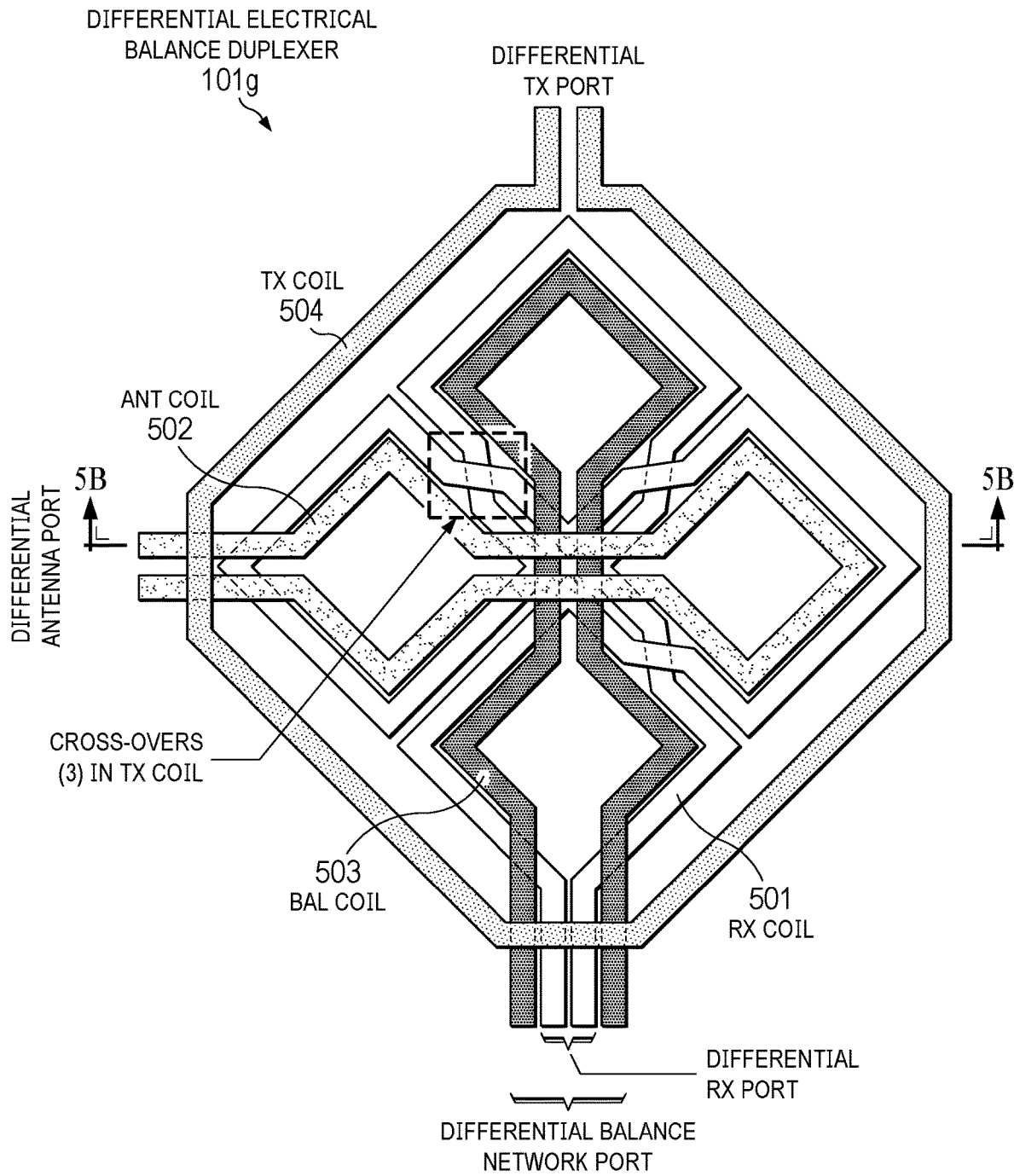
FIGS. 5A-B illustrate an EBD structure having a clover-shaped four-turn non-concentric RX coil of a first layer aligned with a TX coil of a second layer, each of the TX and RX coils electromagnetically coupled with an ANT coil of a third layer and a BAL coil of a fourth layer, in another example.
Figure 5B:
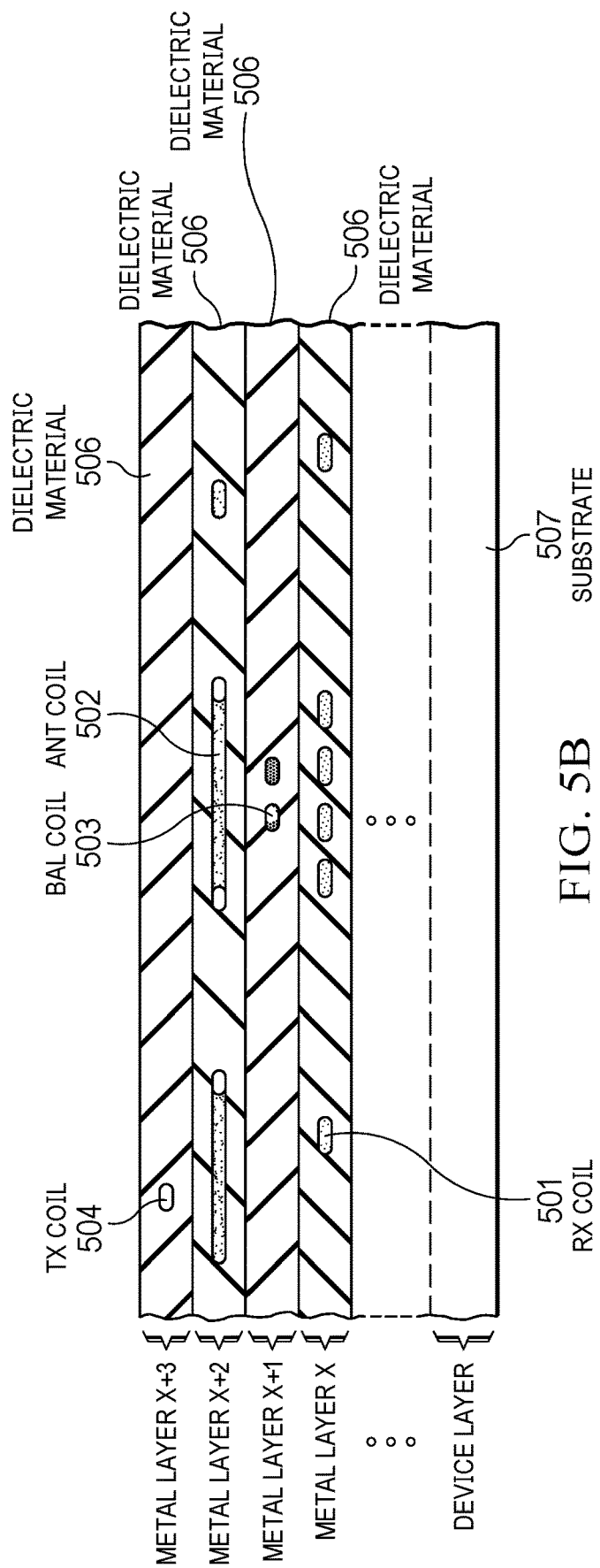

FIGS. 5A-B illustrate an EBD structure 101g having a clover-shaped four-turn non-concentric RX coil 501 of a first layer aligned with a TX coil 504 of a second layer, each of the TX and RX coils electromagnetically coupled with an ANT coil 502 of a third layer and a BAL coil 503 of a fourth layer, in an example. FIG. 5B shows a cross-section of the structure 101g taken at the dashed line 5B-5B of FIG. 5A. As shown, the structure includes a substrate 507 upon which a device layer is formed, including various devices and circuits (e.g., transmitter and receiver circuits, filters, etc.), and a number of metallization layers above that device layer. In this example, the RX coil 501 is included in layer X, the BAL coil 503 is included in layer X+1, the ANT coil 502 is included in layer X+2, and the TX coil 504 is included in layer X+3. As described above, the order of the layers (with respect to which coil is in what layer) can vary from one example to the next, and other such examples may include the four coils in only three layers by utilizing crossovers. The above and below relevant description equally applies here, with respect to the various functional and structural commonalities with the other EBD structures described above and below.

Each of the TX coil 504 and RX coil 501 electromagnetically couples, without direct physical conductive contact, with ANT coil 502 and BAL coil 503. The ANT coil 502 and BAL coil 503 overlap with one another and are located in separate layers in this example. However, in another example, the ANT coil 502 and BAL coil 503 can be in the same layer, and one or both of them can include crossovers with respect to the other, in the central region of structure 101g where they would otherwise intersect. The crossovers can be accomplished, for instance, using the TX coil layer as ample free space exists in that location, such as described with reference to the example of FIG. 3A.

The RX coil 501 crosses over itself in three locations (as highlighted in the dashed boxes of FIG. 5A), for example, by extending from the first layer into the third layer and passing over itself and then extending back from the third layer to the first layer. The TX coil 504 is symmetrically aligned with the RX coil 501, and follows the perimeter of the RX coil 501. In this example, the TX coil 504 is outward of the RX coil 501, such that the inner perimeter of the TX coil 504 is substantially aligned with the outer perimeter of the RX coil 501. In some such examples, the inner perimeter of TX coil 504 is directly over (or under) the outer perimeter of RX coil 501, or within 0.01 µm to 3 µm of the outer perimeter of RX coil 501. As described above, the tolerance on alignment may vary depending on factors such as size of coils (larger coils may allow for larger tolerance) and desired degree of flux cancellation.

The RX coil 501 includes a first quarter, a second quarter, a third quarter, and a fourth quarter, to provide four turns of the RX coil 501. The first, second, third, and fourth quarters are substantially symmetrical with one another, except for crossover and feedline portions. The TX coil 504 has no crossover but has similar, slightly larger perimeter, given that it is outward of the RX coil 501 and follows the outer perimeter of the RX coil 501. Such a symmetrical arrangement of decoupled coils allows for the RX coil 501 and the TX coil 504 to avoid coupling, through flux cancellation.

The ANT coil 502 is located in two of the four quarters making up the RX coil 501 and the BAL coil 203 is located in the other two quarters of the RX coil 501, which allows each of the ANT coil 502 and BAL coil 503 to separately and electromagnetically couple to the RX coil 501 and TX coil 504 without any cancellation, while the RX coil 501 and TX coil 504 remain isolated from one another. In this example, the ANT coil 502 is inward of the RX coil 501, such that the outer perimeter of the ANT coil 502 is substantially aligned with the inner perimeter of two quarters of the RX coil 501; likewise, the BAL coil 503 is inward of the RX coil 501, such that the outer perimeter of the BAL coil 503 is substantially aligned with the inner perimeter of the other two quarters of the RX coil 501. In other examples, each of the ANT coil 502 and the BAL coil 503 may be more directly aligned with respective quarters of the RX coil 501. As shown, the size and shape of the ANT coil 502 and the BAL coil 503 are substantially the same, but they are oriented to facilitate ANT and BAL ports that are arranged away from each other, in this example. The configuration of the feedline portion of each ANT coil 502 and BAL coil 503 can vary from one example to the next, as described above.

Figure 5C:
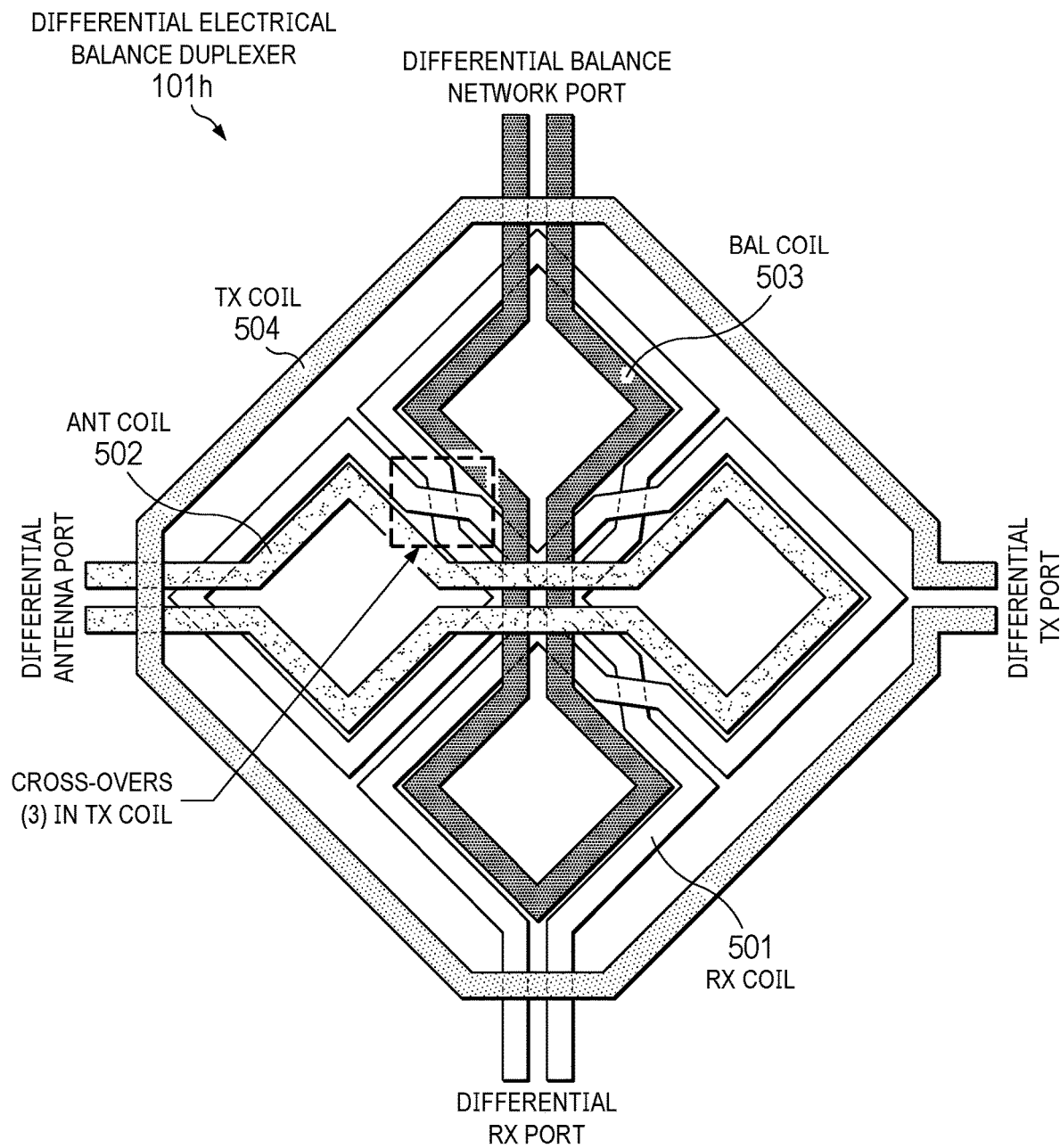
FIG. 5C illustrates an EBD structure having a clover-shaped four-turn non-concentric RX coil of a first layer aligned with a TX coil of a second layer, each of the TX and RX coils electromagnetically coupled with an ANT coil of a third layer and a BAL coil of a fourth layer, in another example.

FIG. 5C illustrates an EBD structure 101h similar to the example of FIG. 5A, except that the BAL coil 503 is rotated 180 degrees so that its differential terminals are at the top instead of the bottom, and the TX coil 504 is rotated 90 degrees clockwise so that its differential terminals are at the right side instead of the top. Other than that, structure 101h is essentially the same as structure 101g, but avoids signal congestion by ensuring that only one signal leaves from each of four general directions (e.g., top, bottom, left and right). The above and below relevant description equally applies here, with respect to the various functional and structural commonalities with the other EBD structures described above and below.

Figure 6:
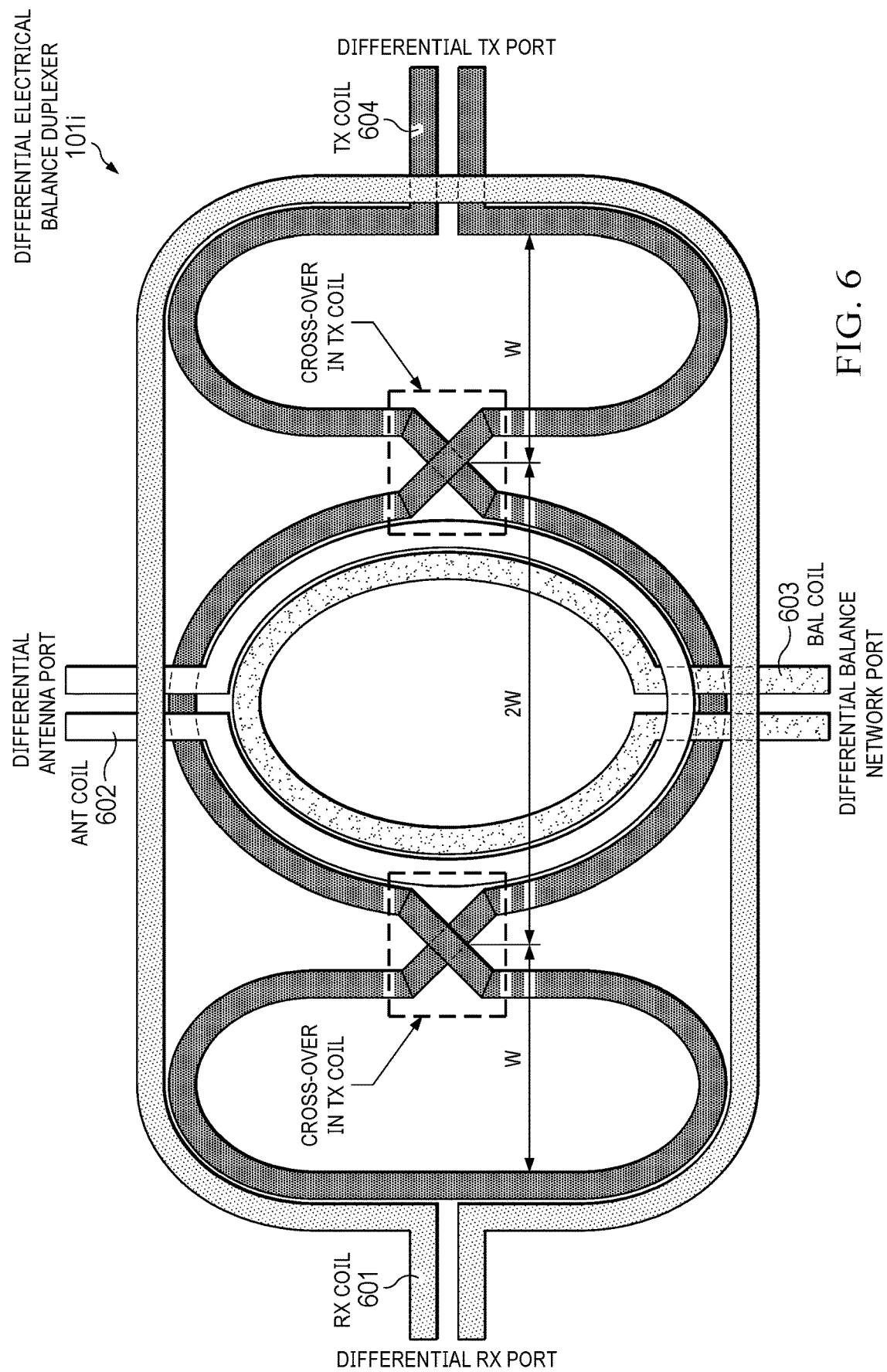
FIG. 6 illustrates an EBD structure having a three-turn non-concentric TX coil of a first layer aligned with an RX coil of a second layer, each of the TX and RX coils electromagnetically coupled with an ANT coil of a third layer and a BAL coil of a fourth layer, in another example.

FIG. 6 illustrates an EBD structure 101i having a three-turn non-concentric TX coil 604 of a first layer aligned with an RX coil 601 of a second layer, and each of the TX and RX coils are able to electromagnetically couple with an ANT coil 602 of a third layer and a BAL coil 603 of a fourth layer, in an example. The ANT coil 602 and BAL coil 603 overlap with one another and are located in separate layers in this example. However, in another example, the ANT coil 602 and BAL coil 603 can be in the same layer, and one or both of them can include crossovers with respect to the other, where they would otherwise intersect. The crossovers can be accomplished, for instance, using the first and/or second layers, as described above. The above and below relevant description equally applies here, with respect to the various functional and structural commonalities with the other EBD structures described above and below.

The TX coil 604 crosses over itself in two locations (as highlighted in the dashed boxes of FIG. 6), by extending from the first layer into the third and/or fourth layer and passing over itself (or under itself, depending on orientation of structure) and then extending back from the third and/or fourth layer to the first layer. The RX coil 601 is symmetrically aligned with the TX coil 604, and loosely follows the perimeter of the TX coil 604. In this example, the RX coil 601 is outward of the TX coil 604, although in other embodiments the RX coil 601 may be more directly aligned with the outermost portions of the TX coil 604. As described above, the degree of alignment may vary depending on factors such as size of coils (larger coils may allow for larger tolerance) and desired degree of flux cancellation between the TX and RX coils.

The TX coil 604 includes a middle loop between a left outer loop and a right outer loop, to provide three turns. As shown in this example, the left and right outer two loops have the same width W, and the middle loop is larger and has a width of 2 W. Other examples may have a middle loop that has a smaller width (e.g., 0.8 W) or a larger width (e.g., 3 W) or the same width (e.g., W). In this example, the left and right outer loops are symmetrical with each other, with respect to both size and shape, except for the feedline portion that couples the right outer loop to the differential TX port. The RX coil 601 is a simple loop with no crossover. Such a symmetrical arrangement allows the RX coil 601 and the TX coil 604 to avoid coupling, through flux cancellation.

Each of the ANT coil 602 and the BAL coil 603 is located in the middle loop of the TX coil 604 but in separate layers (or in the same layer, with crossovers), which allows each of the ANT coil 602 and BAL coil 603 to separately and electromagnetically couple to the RX coil 601 and TX coil 604 without any cancellation, while the RX coil 601 and TX coil 604 remain isolated from one another. As described above, the ANT coil 602 and BAL coil 603 may be, for example, directly aligned with the middle loop of the TX coil 604, or inward (or outward) of the TX coil 604, so long as the desired degree of electromagnetic coupling can be achieved. The size and shape of the ANT coil 602 and the BAL coil 603 can be substantially the same, and they are oriented to facilitate ANT and BAL ports that are arranged away from each other, in this example. The configuration of the feedline portion of each ANT coil 602 and BAL coil 603 can vary from one example to the next, as described above.

Figure 7:
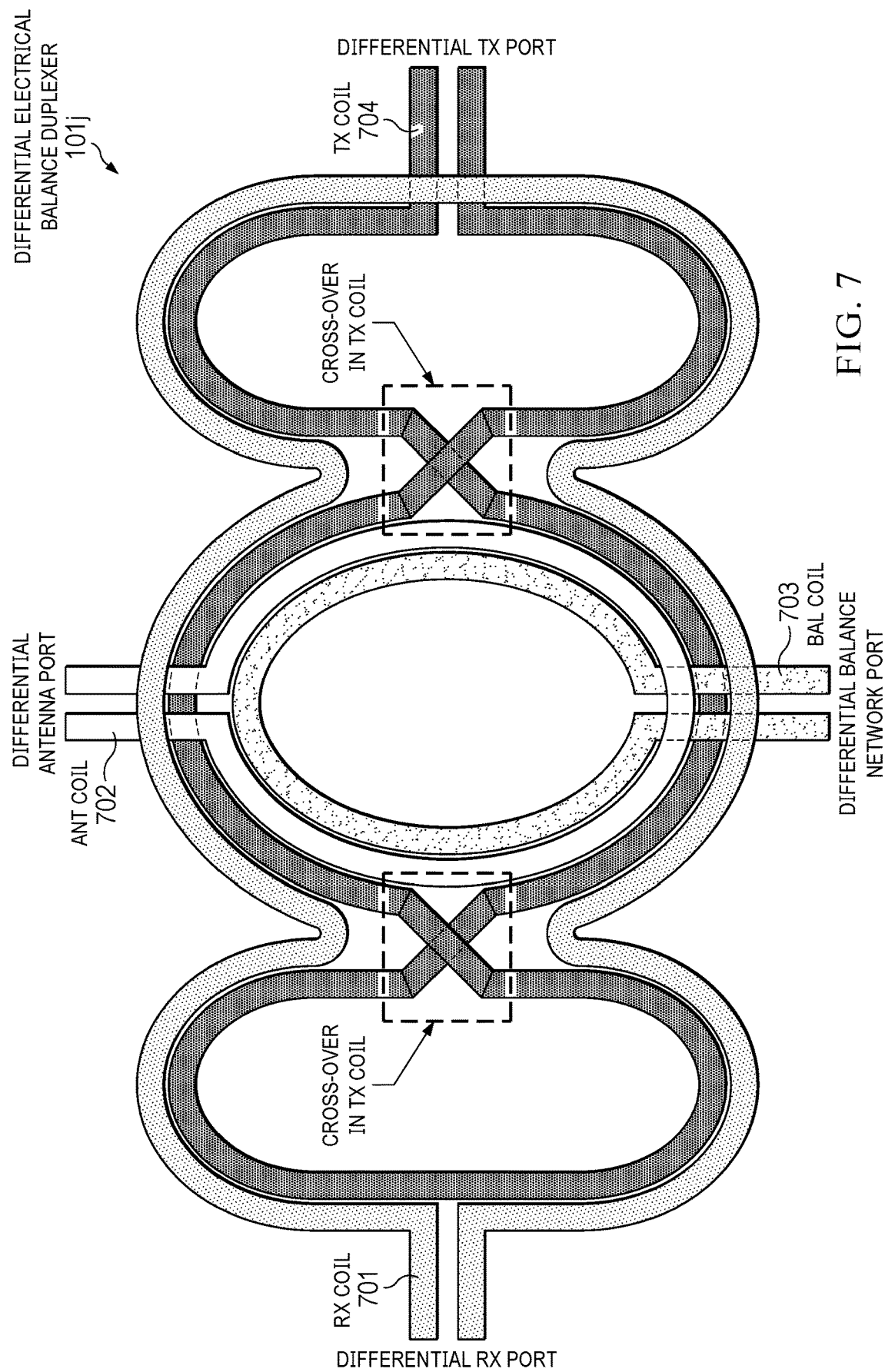
FIG. 7 illustrates an EBD structure having a three-turn non-concentric TX coil of a first layer aligned with an RX coil of a second layer, each of the TX and RX coils electromagnetically coupled with an ANT coil of a third layer and a BAL coil of a fourth layer, in another example.

FIG. 7 illustrates an EBD structure 101j similar to the example of FIG. 6, except that the RX coil 701 more closely follows the perimeter of the TX coil 704. Again, the RX coil 701 and TX coil 704 can be directly aligned with each other (e.g., perfect or otherwise substantial overlap, such that at least one imaginary vertical plane passes through both the RX coil 701 and TX coil 704, for each segment of those two coils, except for deviations such as crossover and feedline portions), or offset from each other where one of the coils is inward or outward of the other coil, so long as the desired level of flux cancellation is achieved. The above and below relevant description equally applies here, with respect to the various functional and structural commonalities with the other EBD structures described above and below.

Figure 8:
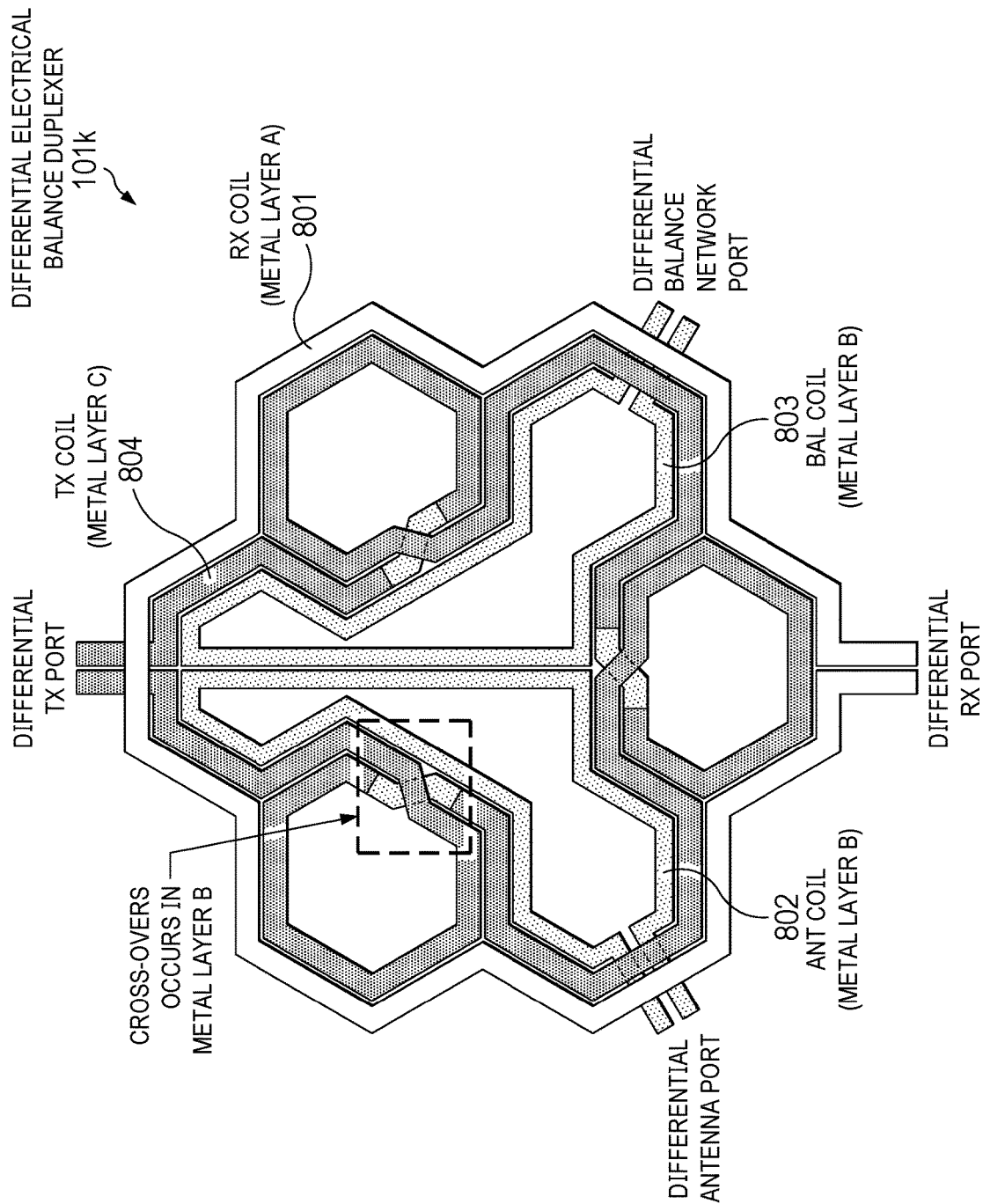
FIG. 8 illustrates an EBD structure having a multi-turn non-concentric TX coil of a first layer aligned with a multi-turn RX coil of a second layer, each of the TX and RX coils electromagnetically coupled with ANT and BAL coils of a third layer, in an example.

FIG. 8 illustrates an EBD structure 101k having a multi-turn non-concentric TX coil 804 of a first layer (metal layer C) aligned with a single-turn honeycomb-shaped RX coil 801 of a second layer (metal layer A), each of the TX and RX coils electromagnetically coupled with an ANT coil 802 and a BAL coil 803 of a third layer (metal layer B), in an example. The above and below relevant description equally applies here, with respect to the various functional and structural commonalities with the other EBD structures described above and below. The metal layer A is shown the left of metal layers B and C for purposes of illustration. In reality, metal layer A would be above or below metal layers B and C, such as in the example case where layers A, B and C are arranged in a stack to provide thick metal layers of an integrated circuit.

The TX coil 804 crosses over itself in three locations (as highlighted in the dashed box of FIG. 8, at one such location), by extending from its primary layer into an adjacent layer and passing over (or under) itself and then extending back to the primary layer. The honeycomb shape of the RX coil 801 is symmetrically aligned with the outer perimeter of the honeycomb shape of the TX coil 804. In this example, the RX coil 801 is outward of the TX coil 804, but in other examples may be directly aligned with the TX coil 804, or inward of the TX coil 804. As described above, the degree of alignment may vary depending on factors such as size of coils (larger coils may allow for larger tolerance) and desired degree of flux cancellation between the TX and RX coils.

Each of the ANT coil 802 and the BAL coil 803 is located in a middle portion of the TX coil 804, which allows each of the ANT coil 802 and BAL coil 803 to separately and electromagnetically couple to the RX coil 801 and TX coil 804 without any cancellation, while the RX coil 801 and TX coil 804 remain isolated from one another. As described above, the ANT coil 802 and BAL coil 803 may be, for example, directly aligned with the middle portion of the TX coil 804, or inward (or outward) of the TX coil 804, so long as the desired degree of electromagnetic coupling can be achieved. The size and shape of the ANT coil 802 and the BAL coil 803 can be substantially the same, and they are oriented to facilitate ANT and BAL ports that are arranged away from each other, in this example. A layer of electrical isolation can be provisioned between ANT coil 802 and the BAL coil 803. The configuration of the feedline portion of each ANT coil 802 and BAL coil 803 can vary from one example to the next, as described above.

Figure 9:
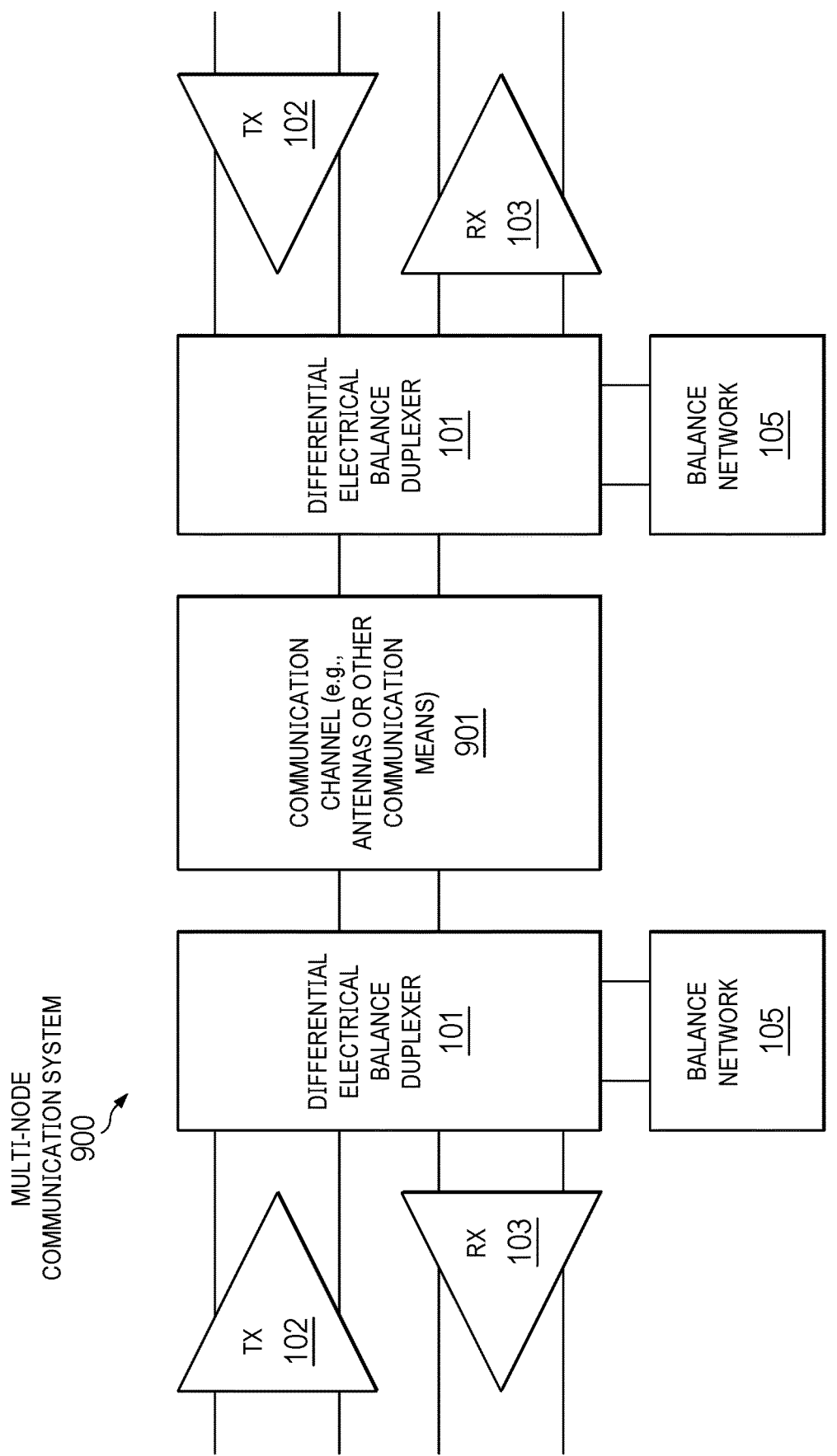
FIG. 9 illustrates a block diagram of a bi-directional communication system having multiple nodes and that includes EBDs, in an example.

FIG. 9 illustrates a block diagram of a bi-directional communication system 900 having multiple nodes and that includes EBDs 101, in an example. In more detail, a first node is to the left of differential communication channel 901, and a second node is to the right of differential communication channel 901. Each of the nodes includes an EBD 101 having differential transmitter 102 coupled to its differential TX port, differential receiver 103 coupled to its differential RX port, and a differential balance network 105 coupled to its differential BAL port. In this manner, each node is similar to the transceiver system 100 shown in FIG. 1, except that the ANT port of the EBDs 101 is coupled to differential communication channel 901, which may or may not include an antenna. The relevant description above is equally applicable here.

The EBDs 101 allow concurrent transmission and reception via communication channel 901 and in the same frequency band. The communication channel 901 can vary from one example to the next, but in some examples includes an antenna, a rotational interface, and/or a series capacitor. To this end, any number of wireless communication links can be used.

Further Examples

Example 1 is an electrical balance duplexer (EBD). The EBD includes a differential transmitter (TX) port coupled to a first coil, a differential receiver (RX) port coupled to a second coil, a differential antenna (ANT) port coupled to a third coil, and a differential balance network (BAL) port coupled to a fourth coil.

Example 2 includes the EBD of Example 1, wherein the first and second coils are configured to isolate the TX port from the RX port by cancelling magnetic flux between the first and second coils.

Example 3 includes the EBD of Example 1 or 2, wherein direct current (DC) isolation exists between the first coil, third coil, and fourth coil.

Example 4 includes the EBD of any one of Examples 1 through 3, wherein the first coil is configured to electromagnetically couple with the third and fourth coils during operation, and the second coil is configured to electromagnetically couple with the third and fourth coils during operation.

Example 5 is a system. The system includes the EBD of any one of Examples 1 through 4, and further includes an antenna coupled to the ANT port of the EBD, a balance network coupled to the BAL port of the EBD, a transmitter coupled to the TX port of the EBD, and a receiver coupled to the RX port of the EBD.

Example 6 includes the system of Example 5, wherein the antenna is part of a communication channel. The communication channel may further include a rotational interface or a capacitive link.

Example 7 is an electrical balance duplexer (EBD) structure. The EBD structure includes a first coil in a first layer and coupled to a differential transmitter (TX) port, a second coil in a second layer and coupled to a differential receiver (RX) port, a third coil in a third layer and coupled to a differential antenna (ANT) port, and a fourth coil in the third layer or a fourth layer and coupled to a differential balance network (BAL) port.

Example 8 includes the EBD structure of Example 7, wherein direct current (DC) isolation exists between the first, third and fourth coils.

Example 9 includes the EBD structure of Example 7 or 8, wherein the first coil is configured to: electromagnetically couple with the third coil during operation, at a first location of the first coil that overlaps the third coil; and electromagnetically couple with the fourth coil during operation, at a second location of the first coil that overlaps the fourth coil.

Example 10 includes the EBD structure of any one of Examples 7 through 9, wherein the second coil is configured to: electromagnetically couple with the third coil during operation, at a first location of the second coil that overlaps the third coil; and electromagnetically couple with the fourth coil during operation, at a second location of the second coil that overlaps the fourth coil.

Example 11 includes the EBD structure of any one of Examples 7 through 10, wherein one of the first coil or the second coil crosses-over itself in one or more locations so as to provide two or more non-concentric turns, and the other of the first coil or the second coil does not crossover itself.

Example 12 includes the EBD structure of Example 11, wherein the one of the first coil or the second coil crosses-over itself in one location and has an 8-shape, the 8-shape including a first half, a second half, and a crossover portion, the first half being substantially symmetrical with the second half, except for: a feedline portion coupled to one of the first or second halves; and the crossover portion.

Example 13 includes the EBD structure of Example 11, wherein the one of the first coil or the second coil crosses-over itself in three locations and has a clover-shape, the clover-shape including a first quarter, a second quarter, a third quarter, and a fourth quarter, the first, second, third, and fourth quarters being substantially symmetrical with one another, except for crossover and feedline portions.

Example 14 includes the EBD structure of Example 11, wherein the one of the first coil or the second coil crosses-over itself in two locations to provide a middle loop between a first outer loop and a second outer loop.

Example 15 includes the EBD structure of Example 14, wherein the fourth coil is in the fourth layer, and the third coil and the fourth coil each overlap with the middle loop, so as to provide electromagnetic coupling with the middle loop, during operation.

Example 16 includes the EBD structure of Example 14 or 15, wherein each of the first and second outer two loops has a respective width of W1, and the middle loop has a width of W2, in which W2 is about twice W1 as measured in an imaginary plane that passes through the two crossover locations.

Example 17 includes the EBD structure of any one of Examples 11 through 16, wherein the other of the first coil or the second coil is a one loop coil.

Example 18 includes the EBD structure of any one of Examples 11 through 17, wherein the other of the first coil or the second coil follows a perimeter of the one of the first coil or the second coil.

Example 19 includes the EBD structure of any one of Examples 7 through 18, wherein the first coil and the second coil are substantially aligned with each other, except for respective feedline portions and crossover portions of the one of the first coil or the second coil.

Example 20 includes the EBD structure of any one of Examples 7 through 19, wherein the first coil is at least partially inward or partially outward of the second coil.

Example 21 includes the EBD structure of any one of Examples 7 through 20, wherein a crossover of the one of the first coil or the second coil is accomplished using the third layer.

Example 22 includes the EBD structure of any one of Examples 7 through 11 and 17 through 21, wherein the first coil and the second coil are each honeycomb shaped.

Example 23 includes the EBD structure of any one of Examples 7 through 22, wherein the third coil crosses-over itself one or more times so as to provide two or more turns, or the fourth coil crosses-over itself one or more times so as to provide two or more turns.

Example 24 includes the EBD structure of Example 23, wherein the two or more turns of the third coil are concentric turns, and the two or more turns of the fourth coil are concentric turns.

Example 25 is a system. The system includes the EBD structure of any one of Examples 7 through 24, and further includes a communication channel coupled to the ANT port of the EBD structure, a balance network coupled to the BAL port of the EBD structure, a transmitter coupled to the TX port of the EBD structure, and a receiver coupled to the RX port of the EBD structure.

Example 26 includes the system of Example 25, wherein the communication channel includes: an antenna; a rotational interface; and/or a series capacitor.

Example 27 is an electrical balance duplexer (EBD) structure. The EBD structure includes a first coil coupled to a first port; a second coil coupled to a second port; a third coil coupled to a third port; and a fourth coil coupled to a fourth port. The first and second coils are arranged to cancel magnetic flux between them, and direct current (DC) isolation exists between the first, third and fourth coils.

Example 28 includes the EBD structure of Example 27, wherein the first coil is configured to electromagnetically couple with the third and fourth coils during operation, and the second coil is configured to electromagnetically couple with at least the third coil during operation.

Example 29 is a system. The system includes the EBD structure of Example 27 or 28, and further includes a communication channel coupled to the third port of the EBD structure, a balance network coupled to the fourth port of the EBD structure, a transmitter coupled to the first port of the EBD structure, and a receiver coupled to the second port of the EBD structure.

Example 30 is a transceiver comprising the EBD or EBD structure of any one of Examples 1 through 4, 7 through 24, 27, or 28.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal," "node," "interconnection," "pin," and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, such as by an end user and/or a third party.

While the use of particular transistors is described herein, other transistors (or equivalent devices) may be used instead. For example, a p-channel field effect transistor (PFET) may be used in place of an n-channel field effect transistor (NFET) with little or no changes to the circuit. Furthermore, other types of transistors may be used (such as bipolar junction transistors (BJTs)). Furthermore, the devices may be implemented in/over a silicon substrate (Si), a silicon carbide substrate (SiC), a gallium nitride substrate (GaN) or a gallium arsenide substrate (GaAs).

References herein to a field effect transistor (FET) being "ON" means that the conduction channel of the FET is present and drain current may flow through the FET. References herein to a FET being "OFF" means that the conduction channel is not present and drain current does not flow through the FET. A FET that is OFF, however, may have current flowing through the transistor's body-diode.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter.

Modifications are possible in the described embodiments, and other embodiments are possible, within the scope of the claims.

What is claimed is:

1. An apparatus comprising:
   a first coil;
   a second coil;
   a third coil, in which each of the first coil, the second coil, and the third coil is direct current (DC) isolated from each other;
   a differential transmitter (TX) port coupled between two ends of the first coil;
   a differential receiver (RX) port coupled between two ends of the second coil; and
   a differential antenna (ANT) port coupled between two ends of the third coil.

2. The apparatus of claim 1, wherein each of the first coil and second coils includes two respective non-concentric turns, and one of the first or second coils includes a cross-over coupled between the two non-concentric turns of the one of the first coil or the second coil.

3. The apparatus of claim 1, further comprising a first dielectric material between the first coil and the third coil, and a second dielectric material between the third coil and the second coil.

4. The apparatus of claim 1, wherein the first coil is configurable to generate a first magnetic flux that propagates through the second coil and the third coil and induces a first current in the third coil during a first operation, and the second coil is configurable to generate a second magnetic flux that propagates through the first coil and the third coil and induces a second current in the third coil during a second operation.

5. The apparatus of claim 1, further comprising:
   an antenna coupled to the differential ANT port of the duplexer;
   a transmitter having differential outputs coupled to the differential TX port of the duplexer; and
   a receiver having differential inputs coupled to the differential RX port of the duplexer.

6. The apparatus of claim 5, wherein the antenna is part of a communication channel.

7. An apparatus comprising:
   a first coil coupled between a first differential port;
   a second coil coupled between a second differential port; and
   a third coil coupled between a third differential port,
   in which each of the first coil, the second coil, and the third coil is DC isolated from each other, the first coil configurable to generate a first magnetic flux that propagates through the second coil and the third coil, and the second coil configurable to generate a second magnetic flux that propagates through the first coil and the third coil.

8. The apparatus of claim 7, wherein the duplexer includes a first dielectric material between the first and third coils and a second dielectric material between the third and second coils.

9. The apparatus of claim 7, wherein the first and second magnetic fluxes cancel at the first and second coils.

10. The apparatus of claim 7, wherein the first coil includes two non-concentric turns, the second coil includes two non-concentric turns, and one of the first coil or the second coil includes a cross-over portion between the two non-concentric turns of the one of the first coil or the second coil.

11. The apparatus of claim 10, wherein the one of the first coil or the second coil has an 8-shape, the 8-shape including a first half, a second half, the cross-over portion, and a feedline portion coupled to one of the first or second halves.

12. The apparatus of claim 10, wherein the one of the first coil or the second coil has a first quarter, a second quarter, a third quarter, and a fourth quarter, and multiple cross-over portions.

13. The apparatus of claim 10, wherein cross-over portion is a first cross-over portion, the one of the first coil or the second coil includes a first loop, a second loop, a third loop, the first cross-over portion between the first and second loops, and a second cross-over portion between the second and third loops.

14. The apparatus of claim 13, further comprising a fourth coil, and the third coil and the fourth coil each overlap at least partially with the second loop.

15. The apparatus of claim 13, wherein each of the first and third loops have a first loop width, the second loop has a second loop width between the first and second cross-over portions, and the second loop width is twice of the first loop width.

16. The apparatus of claim 10, wherein the other of the first coil or the second coil is a one loop coil.

17. The apparatus of claim 10, wherein the other of the first coil or the second coil follows a perimeter of the one of the first coil or the second coil.

18. The apparatus of claim 7, wherein the first coil and the second coil are substantially aligned with each other, except for respective feedline portions and cross-over portions of the one of the first coil or the second coil.

19. The apparatus of claim 7, wherein the first coil is at least partially inward or partially outward of the second coil.

20. The apparatus of claim 7, wherein the first coil is in a first layer and includes a crossover portion in the first layer and in a second layer, and the second coil is in the second layer or in a third layer.

21. The apparatus of claim 7, wherein the first coil and the second coil are each honeycomb shaped.

22. The apparatus of claim 7, wherein the third coil includes two or more turns and at least one cross-over each coupled between two of the two or more turns.

23. The apparatus of claim 22, wherein the two or more turns of the third coil are concentric turns.

24. An apparatus comprising:
a first coil coupled between two ends of a first port;
a second coil coupled between two ends of a second port; and
a third coil coupled between two ends of a third port,
in which each of the first, second, and third coils is DC isolated from each other, and one of the first or second coils includes a cross-over portion between two non-concentric turns of the one of the first or second coils.

25. The apparatus of claim 24, wherein the first coil is configurable to generate a first magnetic flux that propagates through the second coil and the third coil during a first operation, the second coil is configurable to generate a second magnetic flux that propagates through the third coil and the first coil during a second operation, and the first and second magnetic fluxes cancel at the first coil and at the second coil.

26. The apparatus of claim 1, wherein the duplexer includes a differential balance network (BAL) port coupled between two ends of a fourth coil, the fourth coil being DC isolated from each of the first, second, and third coils.

27. The apparatus of claim 26, further comprising a balance network coupled to the BAL port.

28. The apparatus of claim 2, wherein the third coil is concentric with one of the first or second coils.

29. The apparatus of claim 4, wherein the first and second magnetic fluxes cancel each other at the first and second coils.

30. The apparatus of claim 1, wherein the first and second coils are in different metal layers.

31. The apparatus of claim 1, wherein the first coil and second coil include turns that are in a same metal layer.

32. The apparatus of claim 1, wherein the duplexer includes a differential balance network (BAL) port coupled between two ends of a fourth coil, the fourth coil being DC isolated from each of the first, second, and third coils.

33. The apparatus of claim 1, wherein the second coil is within a perimeter of the first coil, and the second coil includes an even number of non-concentric turns and an odd number of cross-overs coupled between the non-concentric turns.

34. The apparatus of claim 1, wherein the first coil is within a perimeter of the second coil, and the first coil includes an even number of non-concentric turns and an odd number of cross-overs coupled between the non-concentric turns.

35. The apparatus of claim 1, wherein the first, second, and third coils, the differential transmitter port, the differential receiver port, and the differential antenna port are part of a duplexer.

36. The apparatus of claim 1, further comprising a transmitter circuit coupled to the differential transmitter port and a receiver circuit coupled to the differential receiver port.

37. The apparatus of claim 36, wherein transmitter circuit and the receiver circuit are in a substrate of an integrated circuit, and the first, second, and third coils are in one or more metal layers of the integrated circuit over the substrate.

38. An apparatus comprising:
an integrated circuit including:
a substrate including a transmitter circuit having first ports and a receiver circuit having second ports; and
one or more metal layers over the substrate, the metal layers including a first coil coupled between the first ports, a second coil coupled between the second ports, and a third coil coupled between third ports, in which each of the first coil, the second coil, and the third coil is DC isolated from each other, the first coil configurable to generate a first magnetic flux that propagates through the second coil and the third coil, and the second coil configurable to generate a second magnetic flux that propagates through the first coil and the third coil.

39. The apparatus of claim 38, further comprising an antenna coupled to the third port.

40. The apparatus of claim 38, wherein the one or more metal layers includes a fourth coil coupled between fourth ports, the fourth coil being DC isolated from each of the first, second, and third coils.

41. The apparatus of claim 40, further comprising a balance network coupled to the fourth ports.

* * * * *